US012735092B2

(12) United States Patent
Tamura et al.

(10) Patent No.: US 12,735,092 B2
(45) Date of Patent: Sep. 15, 2026

(54) MOTOR CONTROL DEVICE

(71) Applicant: JTEKT CORPORATION, Kariya (JP)

(72) Inventors: Tsutomu Tamura, Nara (JP); Robert Fuchs, Nara (JP); Mitsuko Yoshida, Nara (JP)

(73) Assignee: JTEKT CORPORATION, Kariya (JP)

( * ) Notice: Subject to any disclaimer, the term of this patent is extended or adjusted under 35 U.S.C. 154(b) by 92 days.

(21) Appl. No.: 18/693,843

(22) PCT Filed: Jan. 28, 2022

(86) PCT No.: PCT/JP2022/003358
§ 371 (c)(1), (2) Date: Mar. 20, 2024

(87) PCT Pub. No.: WO2023/062853
PCT Pub. Date: Apr. 20, 2023

(65) Prior Publication Data

US 2024/0383526 A1 Nov. 21, 2024

(30) Foreign Application Priority Data

Oct. 13, 2021 (WO) .................. PCT/JP2021/037906

(51) Int. Cl.
*B62D 5/04* (2006.01)

(52) U.S. Cl.
CPC .................................. *B62D 5/0463* (2013.01)

(58) Field of Classification Search
CPC ...... B62D 5/0463; B62D 1/286; B62D 6/007; B62D 15/025; H02P 21/13; H02P 21/20; H02P 23/12; H02P 23/14
See application file for complete search history.

(56) References Cited

U.S. PATENT DOCUMENTS 9,592,850 B1 3/2017 Kataoka et al.
2015/0151786 A1 6/2015 Fujii
(Continued)

FOREIGN PATENT DOCUMENTS

CN 104684792 A 6/2015
CN 105480296 A 4/2016
(Continued)

OTHER PUBLICATIONS

Apr. 12, 2022 International Search Report issued in International Patent Application No. PCT/JP2022/003358.
(Continued)

*Primary Examiner* — Joseph J Dallo
(74) *Attorney, Agent, or Firm* — Oliff PLC

(57) ABSTRACT

A motor control device includes: an assist torque instruction value generation unit that generates an assist torque instruction value using steering torque; a manual steering instruction value generation unit that generates a manual steering instruction value using the steering torque and the assist torque instruction value; an integrated angle instruction value computation unit that computes an integrated angle instruction value by adding the manual steering instruction value to an automatic steering instruction value for driving assist; and a switching unit that switches between a first control mode, in which the electric motor is controlled based on the assist torque instruction value or the manual steering instruction value, and a second control mode, in which the electric motor is controlled based on the integrated angle instruction value, according to the steering torque when in a driving assist mode.

5 Claims, 16 Drawing Sheets

(56) References Cited

U.S. PATENT DOCUMENTS

2015/0344066 A1 12/2015 Tsubaki et al.
2016/0096545 A1 4/2016 Nakakuki et al.
2017/0183032 A1 6/2017 Wilhelm et al.
2017/0274928 A1* 9/2017 Minaki .............. B62D 15/0285
2017/0297614 A1* 10/2017 Minaki ................ B62D 15/025
2018/0154936 A1* 6/2018 Yamasaki .......... B62D 15/0285
2018/0178834 A1* 6/2018 Moreillon ................ B62D 6/10
2019/0009816 A1 1/2019 Moreillon et al.
2019/0248412 A1 8/2019 Wilhelm et al.
2019/0263446 A1* 8/2019 Tsubaki ................... B62D 6/00
2019/0276077 A1* 9/2019 Itou ........................ B62D 6/008
2019/0286127 A1 9/2019 Watanabe et al.
2019/0300013 A1* 10/2019 Shiraishi ............... B60W 30/12
2019/0300053 A1* 10/2019 Mizoguchi ...... B60W 30/18163
2019/0315398 A1 10/2019 Moreillon et al.
2019/0329818 A1 10/2019 Shoji et al.
2020/0010111 A1* 1/2020 Tsubaki ............... B62D 5/0463
2020/0039576 A1 2/2020 Shoji
2020/0094870 A1 3/2020 Shoji
2020/0290668 A1 9/2020 Moreillon et al.
2020/0377148 A1 12/2020 Nakade et al.
2021/0061344 A1* 3/2021 Kitazume .............. B62D 1/286
2021/0354748 A1* 11/2021 Kunihiro ................ B62D 6/007
2024/0278650 A1 8/2024 Shoji et al.

FOREIGN PATENT DOCUMENTS

CN 110271532 A 9/2019
CN 110775151 A 2/2020
CN 117652094 A 3/2024
EP 4372980 A1 5/2024
JP 2007-112179 A 5/2007
JP 2015-071345 A 4/2015
JP 2015-093569 A 5/2015
JP 2015-105047 A 6/2015
JP 2015-120374 A 7/2015
JP 2015-217724 A 12/2015
JP 2017035979 A * 2/2017
JP 2017-114324 A 6/2017
JP 2017-211196 A 11/2017
JP 2019-014468 A 1/2019
JP 2019-182393 A 10/2019
JP 2019-194059 A 11/2019
JP 2020-019346 A 2/2020
JP 2020-049962 A 4/2020
JP 2020-192855 A 12/2020
WO WO-2018038108 A1 * 3/2018 ........... B62D 5/0463
WO WO-2018038110 A1 * 3/2018 ........... B62D 5/0484
WO WO-2018151291 A1 * 8/2018 ............... B62D 6/00
WO WO-2019026351 A1 * 2/2019 ............. B62D 6/007
WO 2019/107437 A1 6/2019
WO WO-2019225289 A1 * 11/2019 ........... B62D 15/021
WO WO-2020183988 A1 * 9/2020 ............... B62D 6/00
WO WO-2020195189 A1 * 10/2020 ........ B60W 60/0053

OTHER PUBLICATIONS

Mar. 27, 2025 Extended Search Report issued in European Patent Application No. 22879591.0.
Aug. 19, 2025 Office Action issued in Chinese Patent Application No. 202280069213.2.

* cited by examiner

CCD CAMERA
GPS
RADAR
MAP I NFORMATION
VEHICLE SPEED SENSOR
HIGHER-LEVEL ECU
MOTOR CONTROL ECU
Smode
θ adac
Td
M
1
2
3
4
5
6
7
8
9
10
12
13
14
15
16
17
18
19
20
21
22
23
25
26
27
28
29
201
202

202
40
Td
41
ASSIST TORQUE INSTRUCTION VALUE SETTING UNIT
Tas
42
MANUAL STEERING INSTRUCTION VALUE GENERATION UNIT
θ mdac
W1
WEIGHT SETTING UNIT
49
FIRST WEIGHT MULTIPLICATION UNIT
45
W1 • Tas
Smode
W2
SECOND WEIGHT MULTIPLICATION UNIT
46
W2 • Tmint
θ adac
43
θ sint
44
ANGLE CONTROL UNIT
Tmint
47
Tm
48
TORQUE CONTROL UNIT
31
DRIVE CIRCUIT
18
M
32
CURRENT DETECTION CIRCUIT
23
I 44
$\theta_{sint}$
51
LPF
$\theta_{sin}$
53
53A
$\ddot{\theta}_{sin}$
53B
J
$T_{ff}$
52
52A
52B
PD
$T_{fb}$
55
56
$T_{sint}$
57
1/N
$T_{mint}$
54
$\hat{T}_{lc}$
58
N
$N \cdot T_m$
$T_m$
$\hat{\theta}$
DISTURBANCE TORQUE ESTIMATION UNIT (DISTURBANCE OBSERVER)
$\theta$
1/N
$\theta_m$
ROTATIONAL ANGLE COMPUTATION UNIT
23
60
59

$T_m$
MOTOR CURRENT INSTRUCTION VALUE COMPUTATION UNIT
81
$I_{cmd}$
+
-
82
48
PI CONTROL UNIT
83
PWM CONTROL UNIT
84
I
DRIVE CIRCUIT
31
CURRENT DETECTION CIRCUIT
32

START
S1
De_norm = 0, k = 0, kprev = 0,
W1 = 1, W2 = 0
S2
|Td| ≧ Tth1
?
NO
YES
S21
De_base = De_base_AD
De_base = De_base_MD
S22
S3
kprev = k,
k = k + 1
S4
kprev = k,
k = k − 1
S5
if 0<X<1 then De_norm = X
if X≧1 then De_norm = 1
if X≦0 then De_norm = 0
X = k • Δt / De_base
S6
X≦0 OR X≧1
?
NO
YES
S7
k = kprev
S8
W1 = (1− De_norm)
W2 = De_norm START
S101
De_norm = 0, k = 0, kprev = 0,
W1 = 0, W2 = 1
S102
|Td| ≧ Tth2
?
NO
YES
S103
kprev = k,
k = k + 1
S104
kprev = k,
k = k − 1
S105
if 0<X<1 then De_norm = X
if X≧1 then De_norm = 1
if X≦0 then De_norm = 0
X = k • Δt / De_base
S106
X≦0 OR X≧1
?
NO
YES
S107
k = kprev
S108
W1 = De_norm
W2 = (1 − De_norm)

START
S101
De_norm = 0, k = 0, kprev = 0,
W1 = 0, W2 = 1
S102
|Td| ≧ Tth2
?
NO
YES
S121
De_base = De_base_MD
De_base = De_base_AD
S122
S103
kprev = k,
k = k + 1
S104
kprev = k,
k = k − 1
S105
if 0<X<1 then De_norm = X
if X≧1 then De_norm = 1
if X≦0 then De_norm = 0
X = k • Δt / De_base
S106
X≦0 OR X≧1
?
NO
YES
S107
k = kprev
S108
W1 = De_norm
W2 = (1− De_norm)

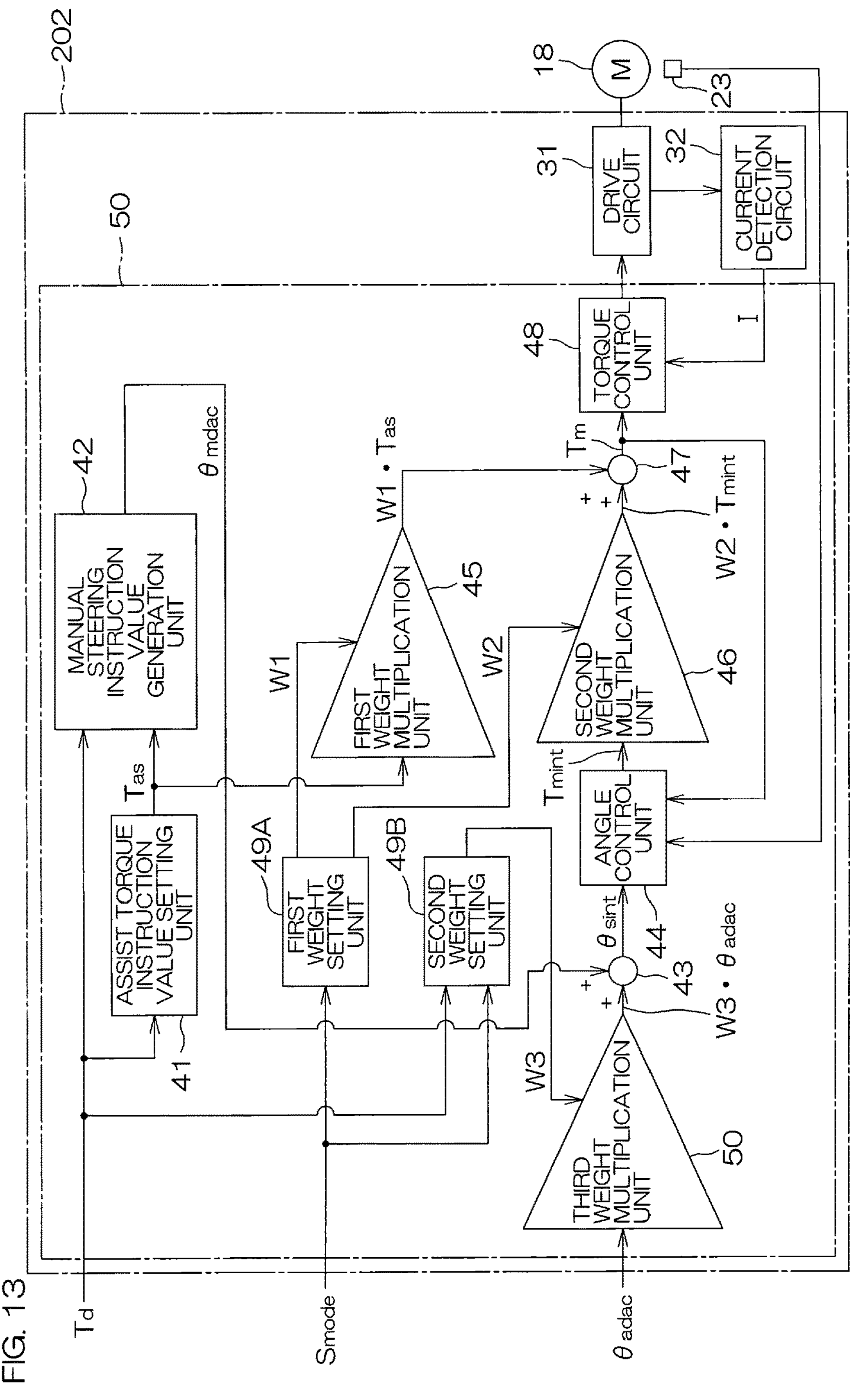
FIG. 13
202
50
18
M
23
31
DRIVE CIRCUIT
32
CURRENT DETECTION CIRCUIT
I
48
TORQUE CONTROL UNIT
42
MANUAL STEERING INSTRUCTION VALUE GENERATION UNIT
θ mdac
W1 · Tas
Tm
47
+
+
Tmint
W2 · Tmint
45
FIRST WEIGHT MULTIPLICATION UNIT
W1
W2
46
SECOND WEIGHT MULTIPLICATION UNIT
Tas
ASSIST TORQUE INSTRUCTION VALUE SETTING UNIT
41
49A
FIRST WEIGHT SETTING UNIT
49B
SECOND WEIGHT SETTING UNIT
ANGLE CONTROL UNIT
44
θ sint
43
W3 · θ adac
W3
THIRD WEIGHT MULTIPLICATION UNIT
Td
Smode
θ adac START
S101A
De_norm = 0, k = 0, kprev = 0,
W3 = 1
S102
|Td| ≧ Tth2
?
NO
YES
S103
kprev = k,
k = k + 1
S104
kprev = k,
k = k − 1
S105
if 0<X<1 then De_norm = X
if X≧1 then De_norm = 1
if X≦0 then De_norm = 0
X = k • Δt / De_base
S106
X≦0 OR X≧1
?
NO
YES
S107
k = kprev
S108A
W3 = (1-De_norm)

START
S101A
De_norm = 0, k = 0, kprev = 0,
W3 = 1
S102
|Td| ≧ Tth2
?
NO
YES
S121
De_base = De_base_MD
De_base = De_base_AD
S122
S103
kprev = k,
k = k + 1
S104
kprev = k,
k = k − 1
S105
if 0<X<1 then De_norm = X
if X≧1 then De_norm = 1
if X≦0 then De_norm = 0
X = k • Δt / De_base
S106
X≦0 OR X≧1
?
NO
YES
S107
k = kprev
S108A
W3 = (1−De_norm)

202
50
$T_d$
42
MANUAL STEERING INSTRUCTION VALUE GENERATION UNIT
ASSIST TORQUE INSTRUCTION VALUE SETTING UNIT
41
$T_{as}$
$\theta_{mdac}$
$S_{mode}$
WEIGHT SETTING UNIT
49C
W3
$\theta_{adac}$
THIRD WEIGHT MULTIPLICATION UNIT
50
+
+
43
W3 • $\theta_{adac}$
$\theta_{sint}$
ANGLE CONTROL UNIT
44
$T_{mint}(=T_m)$
48
TORQUE CONTROL UNIT
31
DRIVE CIRCUIT
18
M
32
CURRENT DETECTION CIRCUIT
23
I

MOTOR CONTROL DEVICE

TECHNICAL FIELD

This invention relates to a control device for an electric motor for steering angle control.

BACKGROUND ART

Patent Document 1 mentioned below discloses a driving assist device that determines whether a driver is grasping a steering wheel when in a steering assist mode, and that cancels steering assist when it is determined that the steering wheel is not held for a predetermined time or more, in which the predetermined time is set according to a travel status of the host vehicle. Specifically, the predetermined time is set to be longer as the vehicle speed is lower and as the lateral deviation between the center of a traveling lane and the host vehicle is smaller.

RELATED ART DOCUMENTS

Patent Documents

Patent Document 1: Japanese Unexamined Patent Application Publication No. 2015-120374 (JP 2015-120374 A)

SUMMARY OF THE INVENTION

Problem to be Solved by the Invention

An object of this invention is to provide a motor control device that allows switching between a first control mode, in which an electric motor is controlled based on an assist torque instruction value or a manual steering instruction value, and a second control mode, in which the electric motor is controlled based on an integrated angle instruction value that is an added value of an automatic steering instruction value for driving assist and the manual steering instruction value, according to steering torque.

Means for Solving the Problem

An embodiment of the present invention provides a motor control device that controls drive of an electric motor for steering angle control, including: an assist torque instruction value generation unit that generates an assist torque instruction value using steering torque; a manual steering instruction value generation unit that generates a manual steering instruction value using the steering torque and the assist torque instruction value; an integrated angle instruction value computation unit that computes an integrated angle instruction value by adding the manual steering instruction value to an automatic steering instruction value for driving assist; and a switching unit that switches between a first control mode, in which the electric motor is controlled based on the assist torque instruction value or the manual steering instruction value, and a second control mode, in which the electric motor is controlled based on the integrated angle instruction value, according to the steering torque when in a driving assist mode.

With this configuration, it is possible to switch between the first control mode, in which the electric motor is controlled based on the assist torque instruction value or the manual steering instruction value, and the second control mode, in which the electric motor is controlled based on the integrated angle instruction value that is an added value of the automatic steering instruction value for driving assist and the manual steering instruction value, according to the steering torque.

The above and other objects, features, and effects of the present invention will become apparent from the following description of an embodiment that will be given with reference to the accompanying drawings.

BRIEF DESCRIPTION OF THE DRAWINGS

FIG. 13 is a block diagram illustrating a modification of the motor control ECU.

MODES FOR CARRYING OUT THE INVENTION

Description of Embodiment of Present Invention

Figure 1:
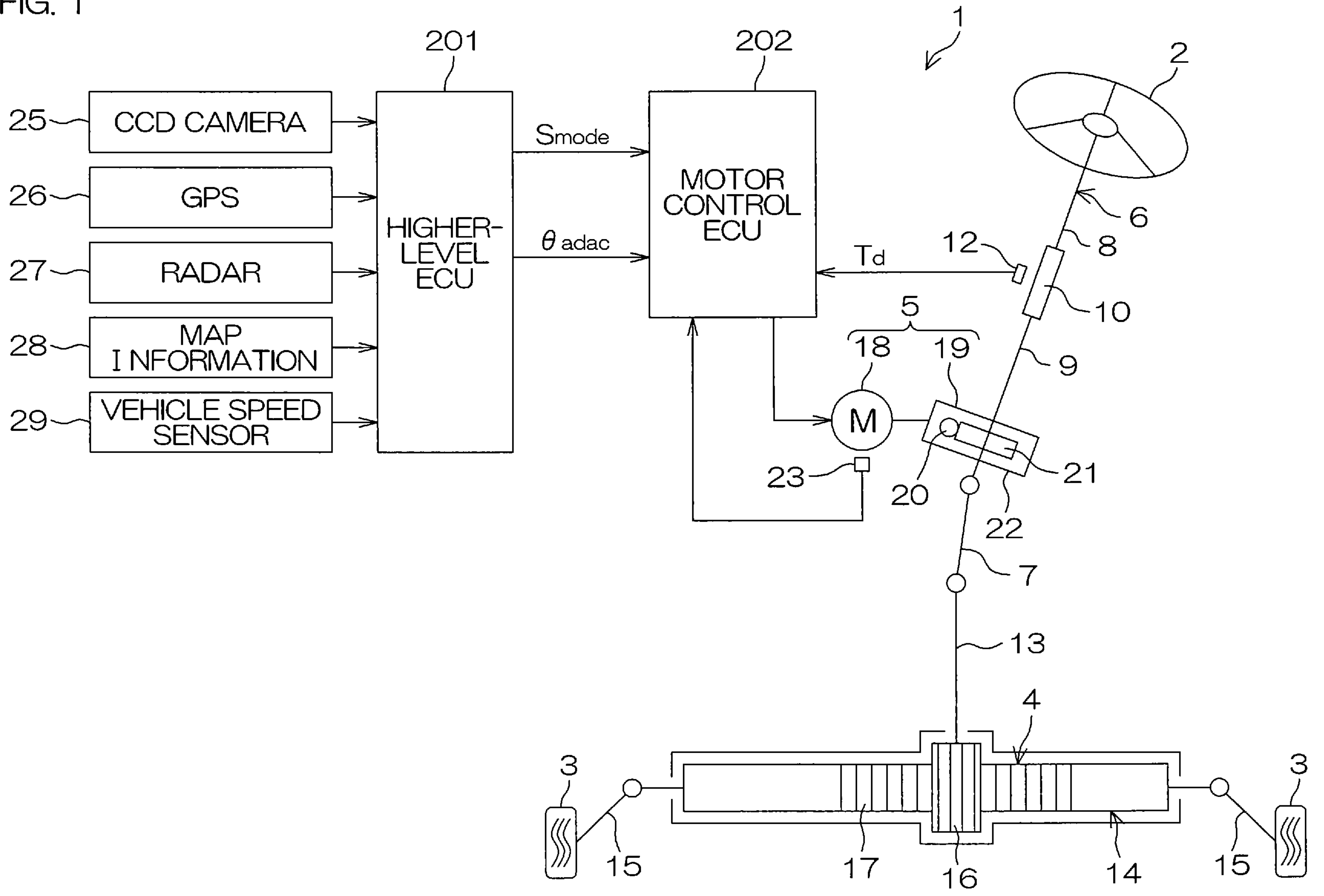
FIG. 1 is a schematic diagram illustrating a schematic configuration of an electric power steering system to which a motor control device according to an embodiment of the present invention is applied.

An embodiment of the present invention provides a motor control device that controls drive of an electric motor for steering angle control, including: an assist torque instruction value generation unit that generates an assist torque instruction value using steering torque; a manual steering instruction value generation unit that generates a manual steering instruction value using the steering torque and the assist torque instruction value; an integrated angle instruction value computation unit that computes an integrated angle instruction value by adding the manual steering instruction value to an automatic steering instruction value for driving assist; and a switching unit that switches between a first control mode, in which the electric motor is controlled based on the assist torque instruction value or the manual steering instruction value, and a second control mode, in which the electric motor is controlled based on the integrated angle instruction value, according to the steering torque when in a driving assist mode.

With this configuration, it is possible to switch between the first control mode, in which the electric motor is controlled based on the assist torque instruction value or the manual steering instruction value, and the second control mode, in which the electric motor is controlled based on the integrated angle instruction value that is an added value of the automatic steering instruction value for driving assist and the manual steering instruction value, according to the steering torque.

In one embodiment of the present invention, a proportion of the second control mode increases as the steering torque increases.

In one embodiment of the present invention, a proportion of the second control mode decreases as the steering torque increases.

In one embodiment of the present invention, the switching unit is configured to switch between the first control mode and the second control mode based on a steering involvement amount that increases when the steering torque is equal to or more than a predetermined threshold and that decreases when the steering torque is less than a predetermined threshold.

In one embodiment of the present invention, the switching unit includes: a first weighting unit that performs a first weighting process on the assist torque instruction value based on the steering torque; a second weighting unit that performs a second weighting process on the integrated angle instruction value based on the steering torque; and a motor torque instruction value computation unit that computes a motor torque instruction value based on the assist torque instruction value after the first weighting process and the integrated angle instruction value after the second weighting process.

In one embodiment of the present invention, the switching unit includes: a third weighting unit that performs a third weighting process on the automatic steering instruction value based on the steering torque; and a motor torque instruction value computation unit that computes a motor torque instruction value based on the automatic steering instruction value after the third weighting process and the manual steering instruction value.

Detailed Description of Embodiment of Present Invention

An embodiment of this invention will be described in detail below with reference to the accompanying drawings.

FIG. 1 is a schematic diagram illustrating a schematic configuration of an electric power steering system to which a motor control device according to an embodiment of the present invention is applied.

An electric power steering system 1 includes: a steering wheel (handle) 2 that is a steering member for steering a vehicle; a steering operation mechanism 4 that steers steered wheels 3 in conjunction with rotation of the steering wheel 2; and a steering assist mechanism 5 that assists a driver in steering. The steering wheel 2 and the steering operation mechanism 4 are mechanically coupled via a steering shaft 6 and an intermediate shaft 7.

The steering shaft 6 includes an input shaft 8 coupled to the steering wheel 2 and an output shaft 9 coupled to the intermediate shaft 7. The input shaft 8 and the output shaft 9 are coupled via a torsion bar 10 so as to be relatively rotatable.

A torque sensor 12 is disposed near the torsion bar 10. The torque sensor 12 detects torsion bar torque $T_d$ applied to the steering wheel 2 based on the amount of relative rotational displacement between the input shaft 8 and the output shaft 9. In this embodiment, the torsion bar torque $T_d$ is detected by the torque sensor 12 such that torque for steering to the left is detected as a positive value and torque for steering to the right is detected as a negative value, with the magnitude of the torsion bar torque $T_d$ becoming larger as the absolute value thereof becomes larger, for example. The torsion bar torque $T_d$ is an example of the "steering torque" according to the present invention.

The steering operation mechanism 4 is a rack and pinion mechanism including a pinion shaft 13 and a rack shaft 14 that is a steered shaft. The steered wheels 3 are coupled to the ends of the rack shaft 14 via tie rods 15 and knuckle arms (not illustrated). The pinion shaft 13 is coupled to the intermediate shaft 7. The pinion shaft 13 is configured to rotate in conjunction with steering of the steering wheel 2. A pinion 16 is coupled to a distal end of the pinion shaft 13.

The rack shaft 14 extends linearly along the right-left direction of the vehicle. A rack 17 that meshes with the pinion 16 is formed on an intermediate portion of the rack shaft 14 in the axial direction. The pinion 16 and the rack 17 convert rotation of the pinion shaft 13 into axial movement of the rack shaft 14. The steered wheels 3 can be steered by moving the rack shaft 14 in the axial direction.

When the steering wheel 2 is steered (rotated), this rotation is transferred to the pinion shaft 13 via the steering shaft 6 and the intermediate shaft 7. The pinion 16 and the rack 17 convert rotation of the pinion shaft 13 into axial movement of the rack shaft 14. The steered wheels 3 are thus steered.

The steering assist mechanism 5 includes an electric motor 18 that generates a steering assist force (assist torque), and a speed reducer 19 that amplifies output torque of the electric motor 18 and that transfers the amplified torque to the steering operation mechanism 4. The speed reducer 19 is a worm gear mechanism including a worm gear 20 and a worm wheel 21 that meshes with the worm gear 20. The speed reducer 19 is housed in a gear housing 22 that is a transfer mechanism housing.

Hereinafter, the speed reduction ratio (gear ratio) of the speed reducer 19 is occasionally represented by N. The speed reduction ratio N is defined as the ratio ($\theta_{wg}/\theta_{ww}$) of a worm gear angle $\theta_{wg}$, that is, the rotational angle of the worm gear 20, to a worm wheel angle $\theta_{ww}$, that is, the rotational angle of the worm wheel 21.

The worm gear 20 is rotationally driven by the electric motor 18. The worm wheel 21 is coupled to the output shaft 9 so as to be rotatable together.

When the worm gear 20 is rotationally driven by the electric motor 18, the worm wheel 21 is rotationally driven so that motor torque is applied to the steering shaft 6 and the steering shaft 6 (output shaft 9) is rotated. Rotation of the steering shaft 6 is transferred to the pinion shaft 13 via the intermediate shaft 7. Rotation of the pinion shaft 13 is converted into axial movement of the rack shaft 14. The steered wheels 3 are thus steered. That is, rotationally driving the worm gear 20 using the electric motor 18 enables steering assist by the electric motor 18 and steering of the steered wheels 3. The electric motor 18 is provided with a rotational angle sensor 23 that detects the rotational angle of a rotor of the electric motor 18.

The torque that is applied to the output shaft 9 (an example of a target to be driven by the electric motor 18) includes motor torque from the electric motor 18 and disturbance torque $T_{lc}$ other than the motor torque. The disturbance torque $T_{lc}$ other than the motor torque includes torsion bar torque $T_d$, road surface load torque (road surface reaction torque) $T_{rl}$, friction torque $T_f$, etc.

The torsion bar torque $T_d$ is torque that is applied from the steering wheel 2 side to the output shaft 9 due to a force that is applied to the steering wheel 2 by the driver, a force that is generated by steering inertia, etc.

The road surface load torque $T_{rl}$ is torque that is applied from the steered wheel 3 side to the output shaft 9 via the rack shaft 14 due to self-aligning torque that is generated in tires, a force that is generated by suspensions and tire wheel alignment, a friction force of the rack and pinion mechanism, etc.

The vehicle is equipped with a CCD (Charge Coupled Device) camera 25 that captures an image of the road ahead of the vehicle in the advancing direction, a GPS (Global Positioning System) 26 that detects the position of the host vehicle, a radar 27 that detects a road shape and obstacles, a map information memory 28 that stores map information, and a vehicle speed sensor 29.

The CCD camera 25, the GPS 26, the radar 27, the map information memory 28, and the vehicle speed sensor 29 are connected to a higher-level ECU (ECU: Electronic Control Unit) 201 that performs driving assist control. The higher-level ECU 201 performs surrounding environment recognition, vehicle position estimation, route planning, etc. based on information obtained by the CCD camera 25, the GPS 26, the radar 27, and the vehicle speed sensor 29 and the map information, and determines control target values for steering and drive actuators.

In this embodiment, the driving mode includes a normal mode and a driving assist mode. The higher-level ECU 201 sets an automatic steering instruction value $\theta_{adac}$ for driving assist when in the driving assist mode. In this embodiment, the driving assist is lane centering assist (LCA) for maintaining the vehicle position at the center of a lane (lane center). The automatic steering instruction value $\theta_{adac}$ is a target value for the steering angle for causing the vehicle to travel along the center of the lane. The automatic steering instruction value $\theta_{adac}$ is set based on the vehicle speed, the lateral deviation of the vehicle with respect to a target travel line, and the yaw deviation of the vehicle with respect to the target travel line. A process of setting such an automatic steering instruction value $\theta_{adac}$ is well known, and therefore will not be described in detail here.

The higher-level ECU 201 outputs a mode signal $S_{mode}$ that indicates whether the driving mode is the normal mode or the driving assist mode. The mode signal $S_{mode}$ and the automatic steering instruction value $\theta_{adac}$ are provided to a motor control ECU 202 via an in-vehicle network. The torsion bar torque $T_d$ detected by the torque sensor 12 and an output signal from the rotational angle sensor 23 are input to the motor control ECU 202. The motor control ECU 202 controls the electric motor 18 based on these input signals and information provided from the higher-level ECU 201.

Figure 2:
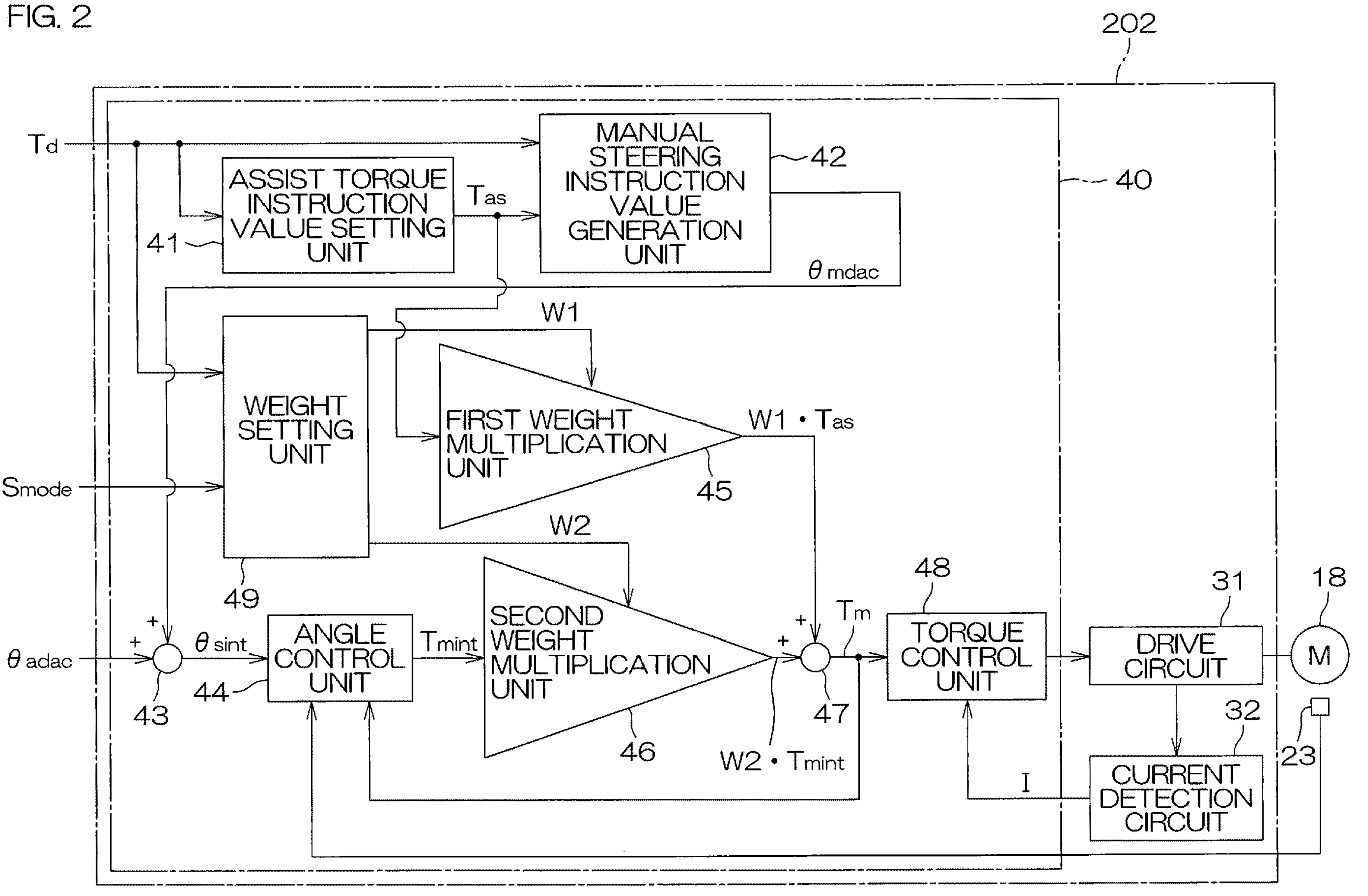
FIG. 2 is a block diagram illustrating the electrical configuration of a motor control ECU.

FIG. 2 is a block diagram illustrating the electrical configuration of the motor control ECU 202.

Operation for a case where the driving mode is the driving assist mode will be mainly described below.

The motor control ECU 202 includes a microcomputer 40, a drive circuit (inverter circuit) 31 that is controlled by the microcomputer 40 and that supplies electric power to the electric motor 18, and a current detection circuit 32 that detects a current (hereinafter referred to as a "motor current I") that flows through the electric motor 18.

The microcomputer 40 includes a CPU and a memory (such as a ROM, a RAM, and a non-volatile memory), and functions as a plurality of functional processing units by executing a predetermined program. The plurality of functional processing units includes an assist torque instruction value setting unit 41, a manual steering instruction value generation unit 42, an integrated angle instruction value computation unit 43, an angle control unit 44, a first weight multiplication unit 45, a second weight multiplication unit 46, an addition unit 47, a torque control unit (current control unit) 48, and a weight setting unit 49.

In this embodiment, the weight setting unit 49 and the first weight multiplication unit 45 are an example of the "first weighting unit" according to the present invention. The weight setting unit 49 and the second weight multiplication unit 46 are an example of the "second weighting unit" according to the present invention. The addition unit 47 is an example of the "motor torque instruction value computation unit" according to the present invention. The weight setting unit 49, the first weight multiplication unit 45, the second weight multiplication unit 46, and the addition unit 47 are an example of the "switching unit" according to the present invention.

Figure 3:
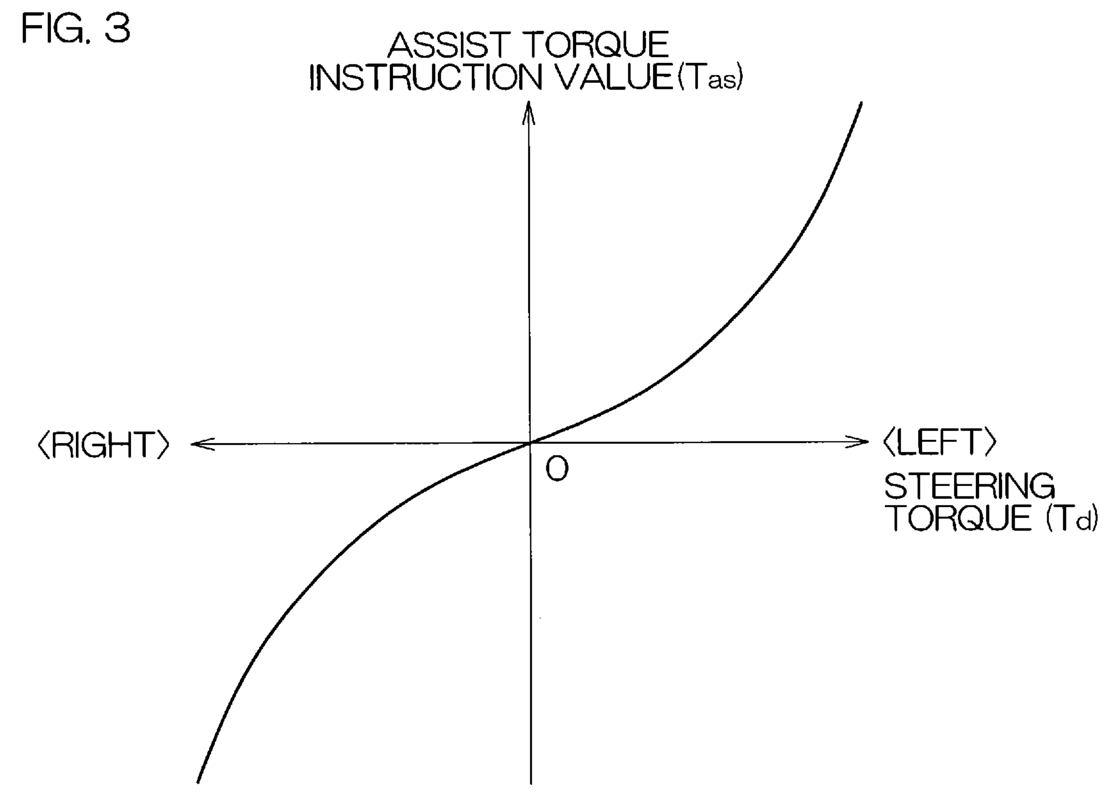
FIG. 3 is a graph illustrating an example of setting an assist torque instruction value $T_{as}$ with respect to torsion bar torque $T_d$.

The assist torque instruction value setting unit 41 sets an assist torque instruction value $T_{as}$ that is a target value for the assist torque necessary for a manual operation. The assist torque instruction value setting unit 41 sets the assist torque instruction value $T_{as}$ based on the torsion bar torque $T_d$ detected by the torque sensor 12. An example of setting of the assist torque instruction value $T_{as}$ with respect to the torsion bar torque $T_d$ is illustrated in FIG. 3.

The assist torque instruction value $T_{as}$ is set to a positive value when the electric motor 18 should generate a steering assist force for steering to the left, and is set to a negative value when the electric motor 18 should generate a steering assist force for steering to the right. The assist torque instruction value $T_{as}$ is positive for a positive value of the torsion bar torque $T_d$, and is negative for a negative value of the torsion bar torque $T_d$. The assist torque instruction value $T_{as}$ is set such that its absolute value becomes larger as the absolute value of the torsion bar torque $T_d$ becomes larger.

The assist torque instruction value setting unit 41 may acquire the vehicle speed from the higher-level ECU 201, and set the assist torque instruction value $T_{as}$ based on the vehicle speed and the torsion bar torque $T_d$. In this case, the assist torque instruction value $T_{as}$ is set according to the torsion bar torque $T_d$ as discussed earlier, and set such that the absolute value of the assist torque instruction value $T_{as}$ becomes smaller as the vehicle speed V becomes higher.

The assist torque instruction value setting unit 41 may compute the assist torque instruction value $T_{as}$ by multiplying the torsion bar torque $T_d$ by a constant set in advance.

The manual steering instruction value generation unit 42 is provided to set, when the driver operates the steering wheel 2, the steering angle (the rotational angle θ of the output shaft 9, to be more exact) that matches the steering wheel operation as a manual steering instruction value $\theta_{mdac}$. The manual steering instruction value generation unit 42 generates the manual steering instruction value $\theta_{mdac}$ using the torsion bar torque $T_d$ detected by the torque sensor 12 and the assist torque instruction value $T_{as}$ set by the assist torque instruction value setting unit 41. The manual steering instruction value generation unit 42 will be discussed in detail later.

The integrated angle instruction value computation unit 43 computes an integrated angle instruction value $\theta_{sint}$ by adding the manual steering instruction value $\theta_{mdac}$ to the automatic steering instruction value $\theta_{adac}$ set by the higher-level ECU 201.

The angle control unit 44 computers an integrated motor torque instruction value $T_{mint}$ that matches the integrated angle instruction value $\theta_{sint}$ based on the integrated angle instruction value $\theta_{sint}$. The angle control unit 44 will be discussed in detail later.

The first weight multiplication unit 45 multiplies the assist torque instruction value $T_{as}$ set by the assist torque instruction value setting unit 41 by a first weight W1. The second weight multiplication unit 46 multiplies the integrated motor torque instruction value $T_{mint}$ by a second weight W2. The first weight W1 and the second weight W2 are set by the weight setting unit 49. Operation of the weight setting unit 49 will be discussed in detail later.

The addition unit 47 computes a motor torque instruction value $T_m$ for the electric motor 18 by adding the assist torque instruction value after being multiplied by the first weight (after a first weighting process), $W1 \cdot T_{as}$, and the integrated motor torque instruction value after being multiplied by the second weight (after a second weighting process), $W2 \cdot T_{mint}$.

The torque control unit 48 drives the drive circuit 31 such that the motor torque of the electric motor 18 is brought closer to the motor torque instruction value $T_m$.

In this embodiment, the manual steering instruction value generation unit 42 sets the manual steering instruction value $\theta_{mdac}$ using a reference EPS model.

Figure 4:
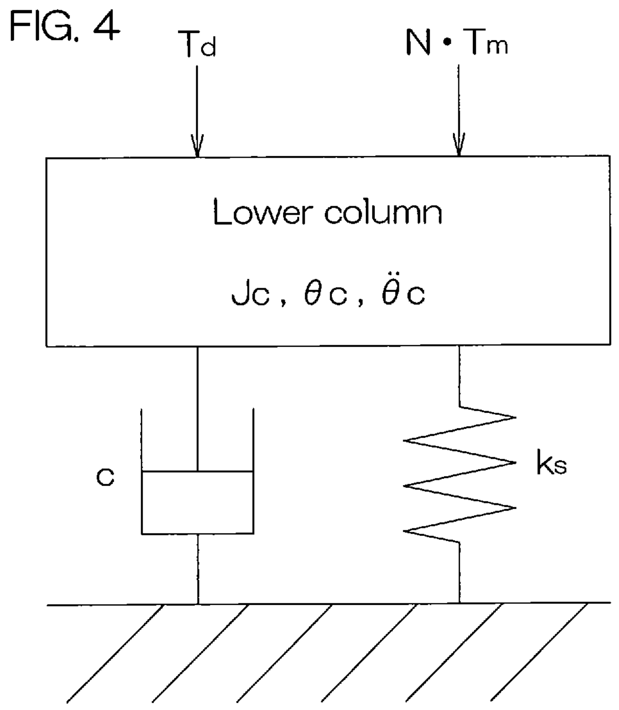
FIG. 4 is a schematic diagram illustrating an example of a reference EPS model that is used by a manual steering instruction value generation unit.

FIG. 4 is a schematic diagram illustrating an example of the reference EPS model that is used by the manual steering instruction value generation unit 42.

This reference EPS model is a single inertia model including a lower column. The lower column corresponds to the output shaft 9 and the worm wheel 21. In FIG. 4, $J_c$ is the inertia of the lower column, $\theta_c$ is the rotational angle of the lower column, and $T_d$ is the torsion bar torque. The torsion bar torque $T_d$, torque $N \cdot T_m$ that acts on the output shaft 9 from the electric motor 18, and the road surface load torque $T_{rl}$ are applied to the lower column. The road surface load torque $T_{rl}$ is given by the following expression (1) using a spring constant $k_s$ and a viscous damping coefficient c.

$$T_{rl} = -k_s \cdot \theta_c - c(d\theta_c / dt) \quad (1)$$

In this embodiment, the spring constant $k_s$ and the viscous damping coefficient c are set to predetermined values obtained in advance through experiments, analyses, etc.

An equation of motion of the reference EPS model is given by the following expression (2).

$$J_c \cdot d^2\theta_c / dt^2 = T_d + N \cdot T_m - k_s \cdot \theta_c - c(d\theta_c / dt) \quad (2)$$

The manual steering instruction value generation unit 42 computes the rotational angle $\theta_c$ of the lower column by solving the differential equation represented by the expression (2) by substituting the torsion bar torque $T_d$ detected by the torque sensor 12 into $T_d$ and substituting the assist torque instruction value $T_{as}$ set by the assist torque instruction value setting unit 41 into $T_m$. The manual steering instruction value generation unit 42 generates the obtained rotational angle $\theta_c$ of the lower column as the manual steering instruction value $\theta_{mdac}$.

Figure 5:
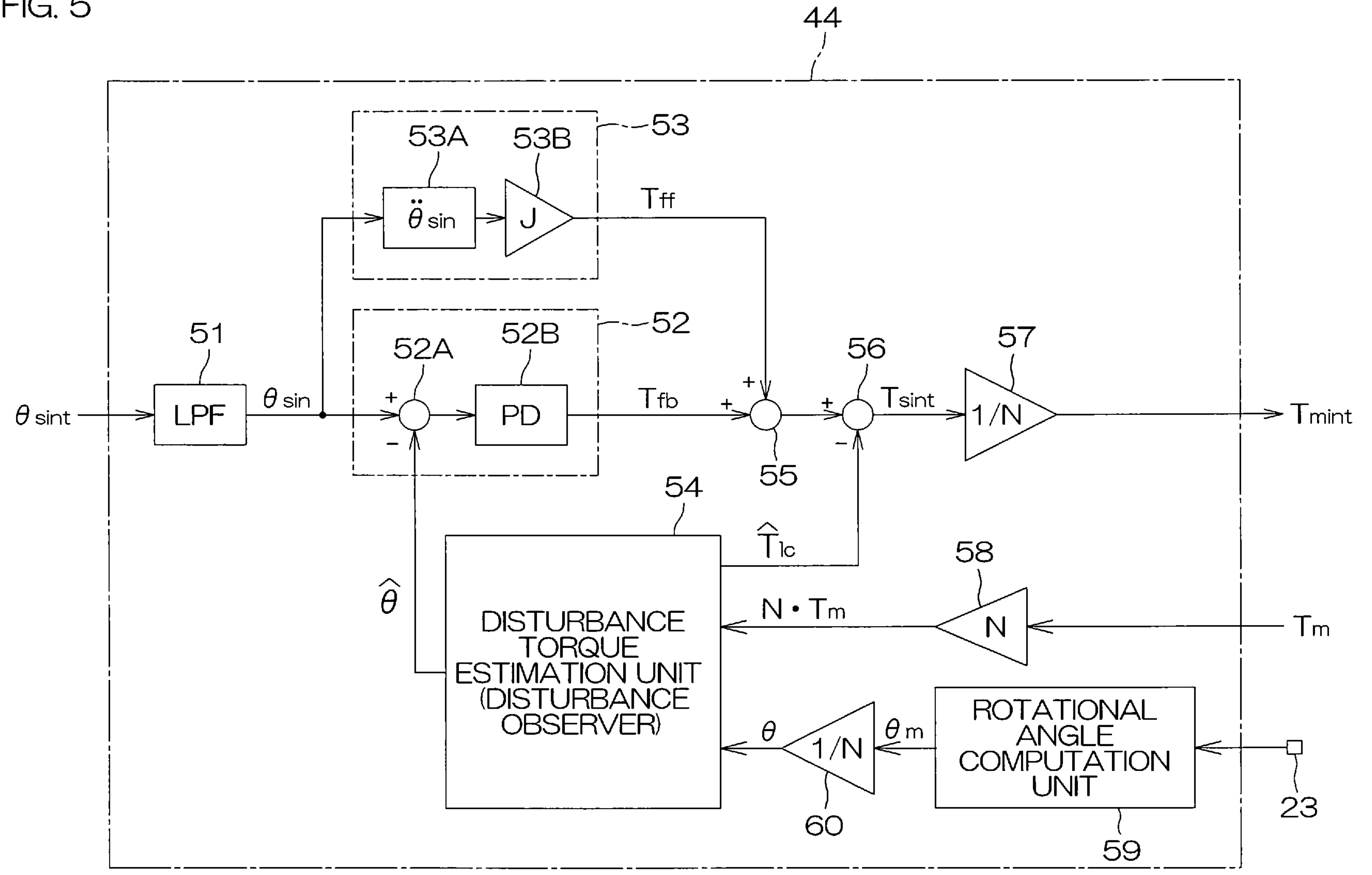
FIG. 5 is a block diagram illustrating the configuration of an angle control unit.

FIG. 5 is a block diagram illustrating the configuration of the angle control unit 44.

The angle control unit 44 computes the integrated motor torque instruction value $T_{mint}$ based on the integrated angle instruction value $\theta_{sint}$. The angle control unit 44 includes a low-pass filter (LPF) 51, a feedback control unit 52, a feedforward control unit 53, a disturbance torque estimation unit 54, a torque addition unit 55, a disturbance torque compensation unit 56, a first speed reduction ratio division unit 57, a speed reduction ratio multiplication unit 58, a rotational angle computation unit 59, and a second speed reduction ratio division unit 60.

The speed reduction ratio multiplication unit 58 converts the motor torque instruction value $T_m$ computed by the addition unit 47 (see FIG. 2) into an output shaft torque instruction value $N \cdot T_m$ that acts on the output shaft 9 (worm wheel 21) by multiplying the motor torque instruction value $T_m$ by the speed reduction ratio N of the speed reducer 19.

The rotational angle computation unit 59 computes a rotor rotational angle $\theta_m$ of the electric motor 18 based on an output signal from the rotational angle sensor 23. The second speed reduction ratio division unit 60 converts the rotor rotational angle $\theta_m$ computed by the rotational angle computation unit 59 into a rotational angle (actual steering angle) $\theta$ of the output shaft 9 by dividing the rotor rotational angle $\theta_m$ by the speed reduction ratio N.

The low-pass filter 51 performs a low-pass filtering process on the integrated angle instruction value $\theta_{sint}$. The integrated angle instruction value $\theta_{sin}$ after the low-pass filtering process is provided to the feedback control unit 52 and the feedforward control unit 53.

The feedback control unit 52 is provided to bring an estimated steering angle value $\hat{\theta}$ computed by the disturbance torque estimation unit 54 closer to the integrated angle instruction value $\theta_{sin}$ after the low-pass filtering process. The feedback control unit 52 includes an angle deviation computation unit 52A and a PD control unit 52B. The angle deviation computation unit 52A computes a deviation $\Delta\theta$ $(=\theta_{sin}-\hat{\theta})$ between the integrated angle instruction value $\theta_{sin}$ and the estimated steering angle value $\hat{\theta}$. The angle deviation computation unit 52A may compute, as the angle deviation $\Delta\theta$, a deviation $(\theta_{sin}-\theta)$ between the integrated angle instruction value $\theta_{sin}$ and the actual steering angle $\theta$ computed by the second speed reduction ratio division unit 60.

The PD control unit 52B computes feedback control torque $T_{fb}$ by performing a PD computation (proportional-derivative computation) for the angle deviation $\Delta\theta$ computed by the angle deviation computation unit 52A. The feedback control torque $T_{fb}$ is provided to the torque addition unit 55.

The feedforward control unit 53 is provided to improve control response by compensating for a delay in response due to the inertia of the electric power steering system 1. The feedforward control unit 53 includes an angular acceleration computation unit 53A and an inertia multiplication unit 53B. The angular acceleration computation unit 53A computes a target angular acceleration $d^2\theta_{sin}/dt^2$ by obtaining the second derivative of the integrated angle instruction value $\theta_{sin}$.

The inertia multiplication unit 53B computes feedforward control torque $T_{ff}$ ($=J \cdot d^2\theta_{sin}/dt^2$) by multiplying the target angular acceleration $d^2\theta_{sin}/dt^2$ computed by the angular acceleration computation unit 53A by an inertia J of the electric power steering system 1. The inertia J is obtained from a physical model (see FIG. 6) of the electric power steering system 1 to be discussed later, for example. The feedforward control torque $T_{ff}$ is provided to the torque addition unit 55 as an inertia compensation value.

The torque addition unit 55 computes a basic torque instruction value ($T_{fb}+T_{ff}$) by adding the feedforward control torque $T_{ff}$ to the feedback control torque $T_{fb}$.

The disturbance torque estimation unit 54 is provided to estimate non-linear torque (disturbance torque: torque other than the motor torque) that is generated as disturbance in a plant (a target to be controlled by the electric motor 18). The disturbance torque estimation unit 54 estimates the disturbance torque (disturbance load) $T_{lc}$, the steering angle θ, and a steering angle differential value (angular velocity) dθ/dt based on the output shaft torque instruction value $N \cdot T_m$ and the actual steering angle θ. The estimated values of the disturbance torque $T_{lc}$, the steering angle θ, and the steering angle differential value (angular velocity) dθ/dt are represented by $\hat{}T_{lc}$, ˆθ, and dˆθ/dt, respectively. The disturbance torque estimation unit 54 will be discussed in detail later.

The estimated disturbance torque value $\hat{}T_{lc}$ computed by the disturbance torque estimation unit 54 is provided to the disturbance torque compensation unit 56 as a disturbance torque compensation value. The estimated steering angle value ˆθ computed by the disturbance torque estimation unit 54 is provided to the angle deviation computation unit 52A.

The disturbance torque compensation unit 56 computes an integrated steering torque instruction value $T_{sint}$ ($=T_{fb}+T_{ff}-\hat{}T_{lc}$) by subtracting the estimated disturbance torque value $\hat{}T_{lc}$ from the basic torque instruction value ($T_{fb}+T_{ff}$). The integrated steering torque instruction value $T_{sint}$ (a torque instruction value for the output shaft 9) with the disturbance torque compensated for is thus obtained.

The integrated steering torque instruction value $T_{sint}$ is provided to the first speed reduction ratio division unit 57. The first speed reduction ratio division unit 57 computes the integrated motor torque instruction value $T_{mint}$ by dividing the integrated steering torque instruction value $T_{sint}$ by the speed reduction ratio N. The integrated motor torque instruction value $T_{mint}$ is provided to the second weight multiplication unit 46 (see FIG. 2).

The disturbance torque estimation unit 54 will be described in detail. The disturbance torque estimation unit 54 is a disturbance observer that estimates the disturbance torque $T_{lc}$, the steering angle θ, and the angular velocity dθ/dt using a physical model 101 of the electric power steering system 1 illustrated in FIG. 6, for example.

The physical model 101 includes a plant (an example of a target to be driven by the motor) 102 that includes the output shaft 9 and the worm wheel 21 fixed to the output shaft 9. The torsion bar torque Ta is applied from the steering wheel 2 to the plant 102 via the torsion bar 10, and the road surface load torque $T_{rl}$ is applied from the steered wheel 3 side to the plant 102.

Moreover, the output shaft torque instruction value $N \cdot T_m$ is applied to the plant 102 via the worm gear 20, and the friction torque $T_f$ is applied to the plant 102 due to the friction between the worm wheel 21 and the worm gear 20.

An equation of motion for the inertia of the physical model 101 is given by the following expression (3), where J is the inertia of the plant 102.

[Math 1]

$$\begin{aligned} J\ddot{\theta} &= N \cdot T_m + T_{lc} \\ T_{lc} &= T_d + T_{rl} + T_f \end{aligned} \tag{3}$$

$d^2\theta/dt^2$ is the angular acceleration of the plant 102. N is the speed reduction ratio of the speed reducer 19. $T_{lc}$ indicates the disturbance torque other than the motor torque that is applied to the plant 102. While the disturbance torque $T_{lc}$ is indicated as the sum of the torsion bar torque $T_d$, the road surface load torque $T_{rl}$, and the friction torque $T_f$ in this embodiment, the disturbance torque $T_{lc}$ actually includes torque other than these.

Figure 6:
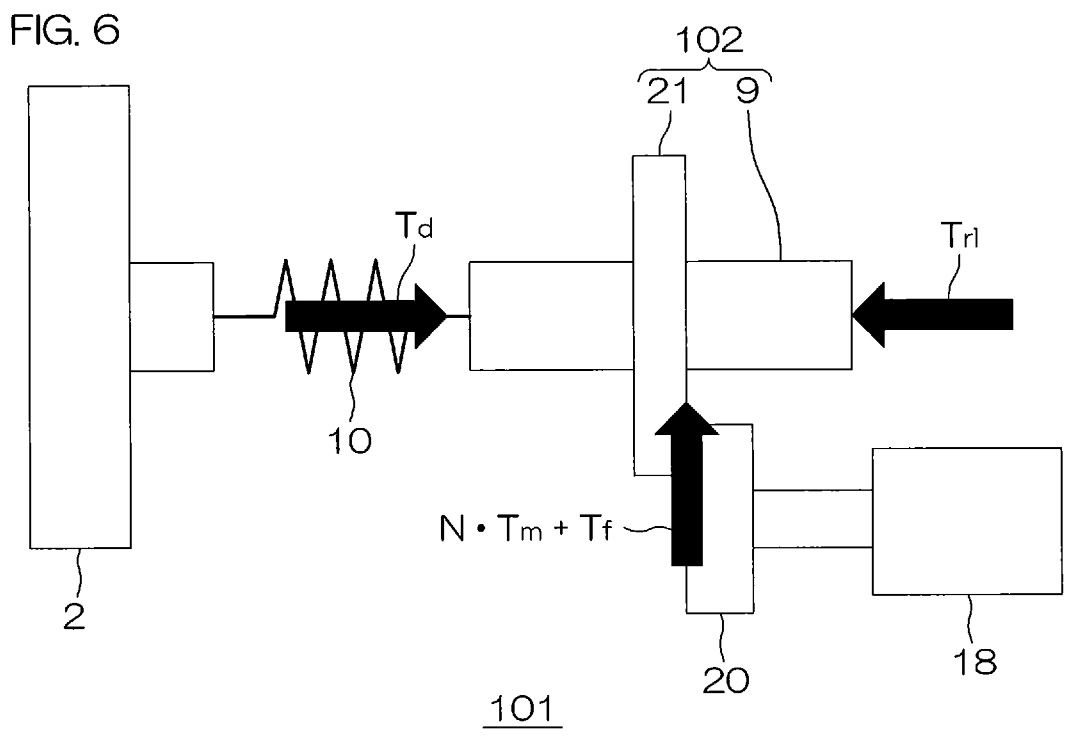
FIG. 6 is a schematic diagram illustrating an example of the configuration of a physical model of the electric power steering system.

An equation of state for the physical model 101 in FIG. 6 is given by the following expression (4).

[Math 2]

$$\begin{cases} \dot{x} = Ax + B_1u_1 + B_2u_2 \\ y = Cx + Du_1 \end{cases} \tag{4}$$

In the above expression (4), x is a state variable vector, $u_1$ is a known input vector, $u_2$ is an unknown input vector, and y is an output vector (measured value). In the above expression (4), A is a system matrix, $B_1$ is a first input matrix, $B_2$ is a second input matrix, C is an output matrix, and D is a direct feedthrough matrix.

The above equation of state is extended to a system including the unknown input vector $u_2$ as one of the states. An equation of state of the extended system (extended equation of state) is given by the following expression (5).

[Math 3]

$$\begin{cases} \dot{x}_e = A_ex_e + B_eu_1 \\ y = C_ex_e \end{cases} \tag{5}$$

In the above expression (5), $x_e$ is a state variable vector of the extended system, and is given by the following expression (6).

[Math 4]

$$x_e = \begin{bmatrix} x \\ u_2 \end{bmatrix} \tag{6}$$

In the above expression (5), $A_e$ is a system matrix of the extended system, $B_e$ is a known input matrix of the extended system, and $C_e$ is an output matrix of the extended system.

A disturbance observer (extended state observer) given by the equation of the following expression (7) is constructed from the extended equation of state represented by the above expression (5).

[Math 5]

$$\begin{cases} \dot{\hat{x}}_e = A_e\hat{x}_e + B_eu_1 + L(y - \hat{y}) \\ \hat{y} = C_e\hat{x}_e \end{cases} \tag{7}$$

In the expression (7), $\hat{x}_e$ represents an estimated value of $x_e$. L is an observer gain. $\hat{y}$ represents an estimated value of y. $\hat{x}_e$ is given by the following expression (8).

[Math 6]

$$\hat{x}_e = \begin{bmatrix} \hat{\theta} \\ \dot{\hat{\theta}} \\ \hat{T}_{lc} \end{bmatrix} \quad (8)$$

In the expression (8), $\hat{\theta}$ is an estimated value of θ, and $\hat{T}_{lc}$ is an estimated value of $T_{lc}$.

The disturbance torque estimation unit 54 computes the state variable vector $\hat{x}_e$ based on the equation of the above expression (7).

Figure 7:
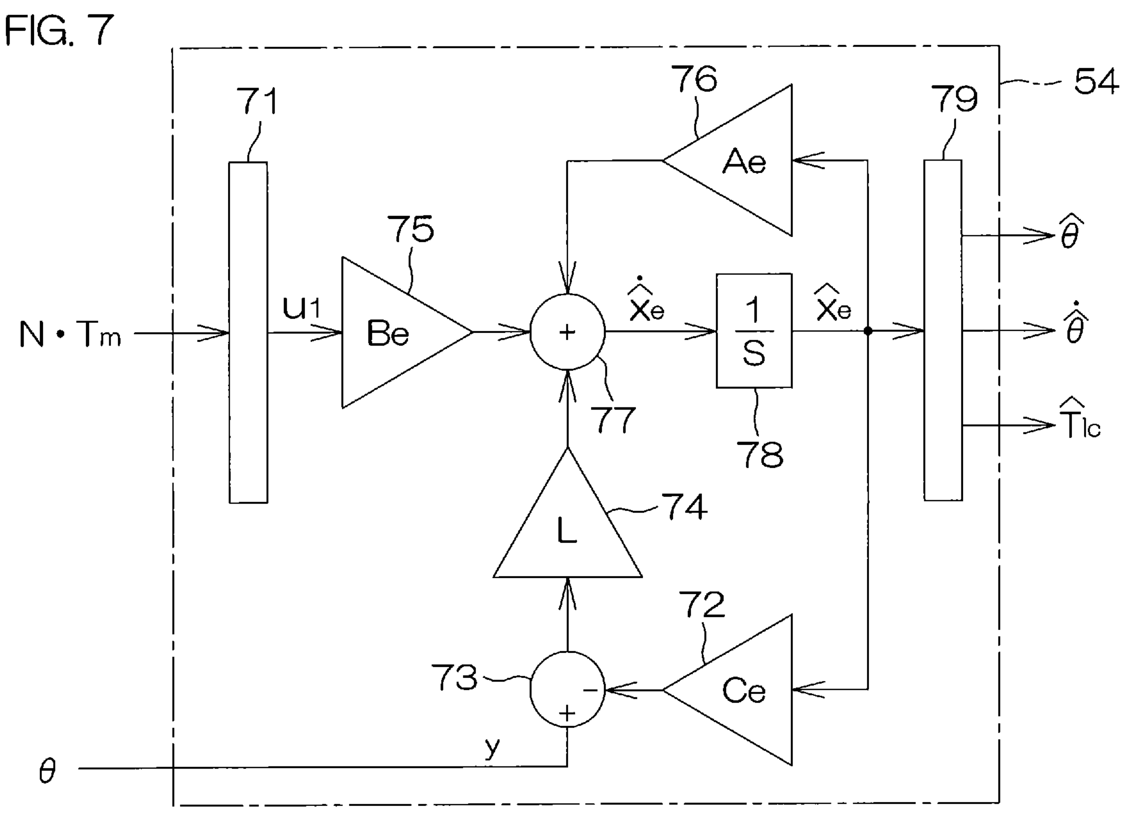
FIG. 7 is a block diagram illustrating the configuration of a disturbance torque estimation unit.

FIG. 7 is a block diagram illustrating the configuration of the disturbance torque estimation unit 54.

The disturbance torque estimation unit 54 includes an input vector input unit 71, an output matrix multiplication unit 72, a first addition unit 73, a gain multiplication unit 74, an input matrix multiplication unit 75, a system matrix multiplication unit 76, a second addition unit 77, an integration unit 78, and a state variable vector output unit 79.

The output shaft torque instruction value $N \cdot T_m$ computed by the speed reduction ratio multiplication unit 58 (see FIG. 5) is provided to the input vector input unit 71. The input vector input unit 71 outputs the input vector $u_1$.

The output of the integration unit 78 is the state variable vector $\hat{x}_e$ (see the above expression (8)). At the start of the computation, an initial value is given as the state variable vector $\hat{x}_e$. The initial value of the state variable vector $\hat{x}_e$ is 0, for example.

The system matrix multiplication unit 76 multiplies the state variable vector $\hat{x}_e$ by the system matrix $A_e$. The output matrix multiplication unit 72 multiplies the state variable vector $\hat{x}_e$ by the output matrix $C_e$.

The first addition unit 73 subtracts the output ($C_e \cdot \hat{x}_e$) of the output matrix multiplication unit 72 from the output vector (measured value) y that is the actual steering angle θ computed by the second speed reduction ratio division unit 60 (see FIG. 5). That is, the first addition unit 73 computes the difference ($y - \hat{y}$) between the output vector y and the estimated output vector value $\hat{y}$ ($=C_e \cdot \hat{x}_e$). The gain multiplication unit 74 multiplies the output ($y - \hat{y}$) of the first addition unit 73 by the observer gain L (see the above expression (7)).

The input matrix multiplication unit 75 multiplies the input vector $u_1$ output from the input vector input unit 71 by the input matrix $B_e$. The second addition unit 77 computes a differential value $d\hat{x}_e/dt$ of the state variable vector by adding the output ($B_e \cdot u_1$) of the input matrix multiplication unit 75, the output ($A_e \cdot \hat{x}_e$) of the system matrix multiplication unit 76, and the output ($L(y - \hat{y})$) of the gain multiplication unit 74. The integration unit 78 computes the state variable vector $\hat{x}_e$ by integrating the output ($d\hat{x}_e/dt$) of the second addition unit 77. The state variable vector output unit 79 computes the estimated disturbance torque value $\hat{T}_{lc}$, the estimated steering angle value $\hat{\theta}$, and the estimated angular velocity value $d\hat{\theta}/dt$ based on the state variable vector $\hat{x}_e$.

Unlike the extended state observer discussed earlier, a typical disturbance observer is composed of an inverse model of the plant and a low-pass filter. An equation of motion of the plant is given by the expression (3) as discussed earlier. Thus, the inverse model of the plant is given by the following expression (9).

[Math 7]

$$T_{lc} = J\ddot{\theta} - N \cdot T_m \quad (9)$$

The inputs to the typical disturbance observer are $J \cdot d^2\theta/dt^2$ and $N \cdot T_m$. Since the second derivative of the actual steering angle θ is used, noise of the rotational angle sensor 23 has a great influence. On the other hand, the extended state observer according to the embodiment discussed earlier estimates the disturbance torque using an integral type. Therefore, the influence of noise due to differentiation can be reduced.

The typical disturbance observer composed of an inverse model of the plant and a low-pass filter may be used as the disturbance torque estimation unit 64.

Figure 8:
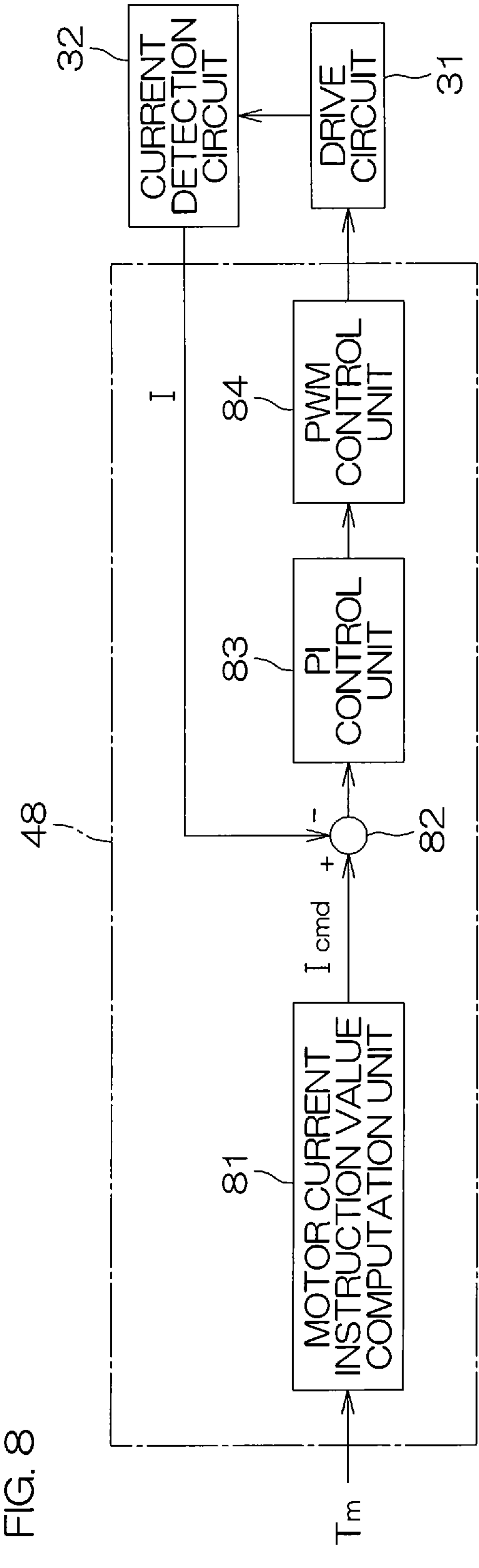
FIG. 8 is a schematic diagram illustrating the configuration of a torque control unit.

FIG. 8 is a schematic diagram illustrating the configuration of the torque control unit 48.

The torque control unit 48 (see FIG. 2) includes a motor current instruction value computation unit 81, a current deviation computation unit 82, a PI control unit 83, and a PWM (Pulse Width Modulation) control unit 84.

The motor current instruction value computation unit 81 computes a motor current instruction value $I_{cmd}$ by dividing the motor torque instruction value $T_m$ computed by the addition unit 47 (see FIG. 2) by a torque constant $K_t$ of the electric motor 18.

The current deviation computation unit 82 computes a deviation ΔI ($=I_{cmd} - I$) between the motor current instruction value $I_{cmd}$ obtained by the motor current instruction value computation unit 81 and the motor current I detected by the current detection circuit 32.

The PI control unit 83 generates a drive instruction value for controlling the motor current I flowing through the electric motor 18 to the motor current instruction value $I_{cmd}$ by performing a PI computation (proportional-integral computation) on the current deviation ΔI computed by the current deviation computation unit 82. The PWM control unit 84 generates a PWM control signal with a duty ratio corresponding to the drive instruction value, and supplies the PWM control signal to the drive circuit 31. Electric power corresponding to the drive instruction value is thus supplied to the electric motor 18.

Figure 9:
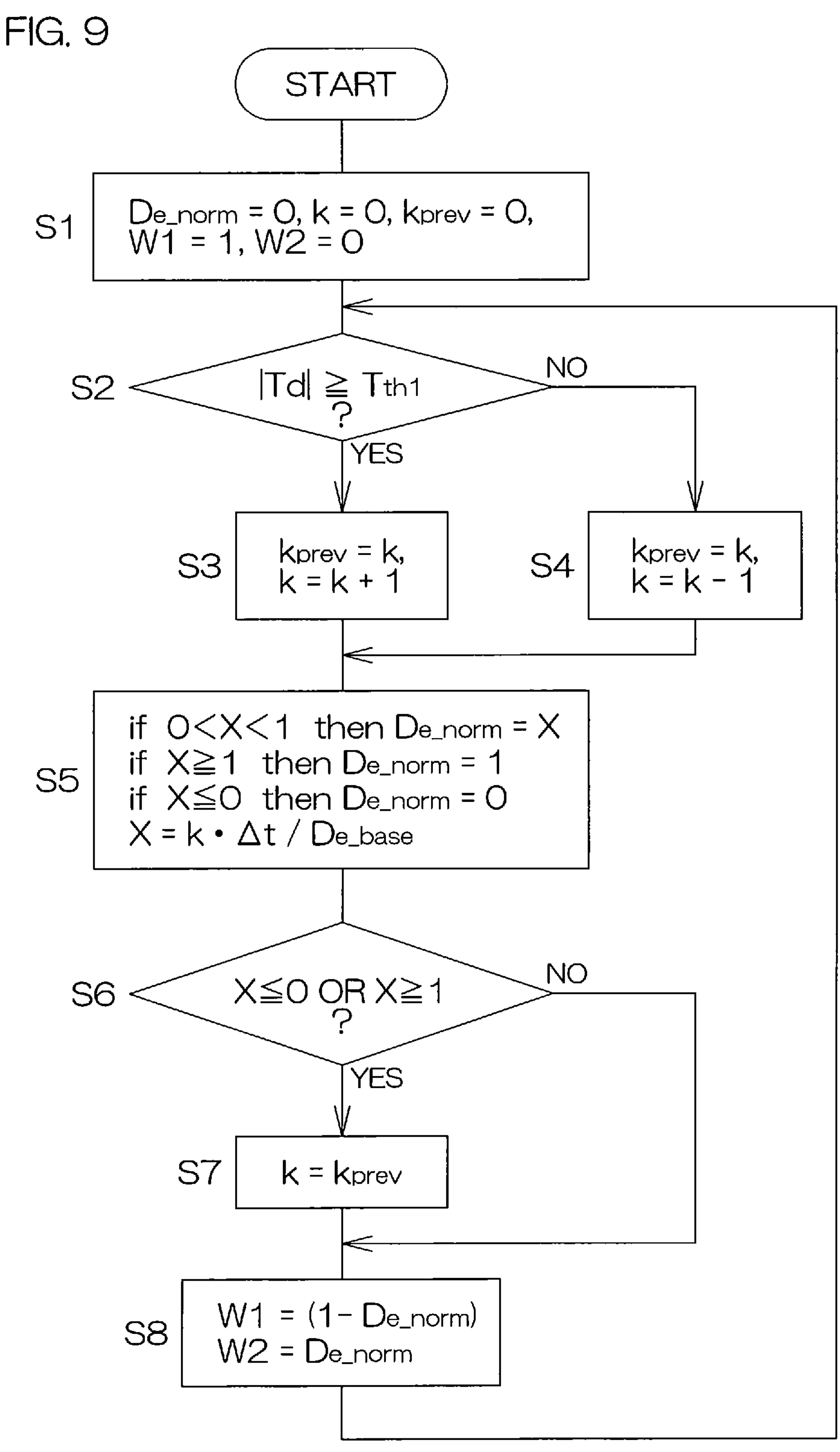
FIG. 9 is a flowchart illustrating the procedure of a weight setting process performed by a weight setting unit when in a driving assist mode.

FIG. 9 is a flowchart illustrating the procedure of a weight setting process performed by the weight setting unit 49 when in the driving assist mode.

When the driving mode is in the driving assist mode, the weight setting unit 49 makes initial setting (step S1). In the initial setting, the weight setting unit 49 sets an operation involvement amount $D_{e\_norm}$ that represents the degree of involvement of the driver in the operation of the steering wheel 2, a counter value k, and a preceding counter value $k_{prev}$ to 0. In addition, the weight setting unit 49 sets the first weight W1 to 1, and sets the second weight W2 to 0. The operation involvement amount $D_{e\_norm}$ takes a value in the range of 0 or more and 1 or less.

When the driving mode is in the driving assist mode, the automatic steering instruction value $\theta_{adac}$ is set by the higher-level ECU 201, and the automatic steering instruction value $\theta_{adac}$ is provided to the motor control ECU 202.

Next, the weight setting unit 49 determines whether an absolute value $|T_d|$ of the torsion bar torque $T_d$ is equal to or more than a predetermined first threshold $T_{th1}$ (step S2).

When $|T_d| \geq T_{th1}$ is met (step S2: YES), the weight setting unit 49 saves the present counter value k as the preceding counter value $k_{prev}$, and thereafter increments the counter value k by 1 (+1) (step S3). Then, the weight setting unit 49 proceeds to step S5.

When it is determined in step S2 that $|T_d|<T_{th1}$ is met (step S2: NO), the weight setting unit 49 saves the present counter value k as the preceding counter value $k_{prev}$, and thereafter decrements the counter value k by 1 (−1) (step S4). Then, the weight setting unit 49 proceeds to step S5.

In step S5, the operation involvement amount $D_{e\_norm}$ is computed based on the following expression (10).

$$\begin{aligned} &\text{if } 0 < X < 1 \text{ then } D_{e\_norm} = X \\ &\text{if } X \geq 1 \text{ then } D_{e\_norm} = 1 \\ &\text{if } X \leq 0 \text{ then } D_{e\_norm} = 0 \\ &X = k \cdot \Delta t / D_{e\_base} \end{aligned} \tag{10}$$

In the expression (10), Δt is a computation period [sec], and $D_{e\_base}$ is an operation involvement reference time [sec]. The processes in step S2 to step S8 in FIG. 9 are repeatedly executed at intervals of a predetermined time. This predetermined time is the computation period Δt.

In the procedure in FIG. 9, the operation involvement reference time $D_{e\_base}$ is a time in which the first weight W1 is set to 0 and the second weight W2 is set to 1 when a state in which the steering wheel 2 is operated (state with $|T_d|\geq T_{th1}$) has continued for the time $D_{e\_base}$ or more from a state in which the first weight W1 is 1 and the second weight W2 is 0, and has been set in advance. The operation involvement reference time $D_{e\_base}$ is also a time in which the first weight W1 is set to 1 and the second weight W2 is set to 0 when a state in which the steering wheel 2 is not operated (state with $|T_d|<T_{th1}$) has continued for the time $D_{e\_base}$ or more from a state in which the first weight W1 is 0 and the second weight W2 is 1.

Next, the weight setting unit 49 determines whether a saturation condition of X≤0 or X≥1 is met (step S6). When the saturation condition is met (step S6: YES), the weight setting unit 49 sets the counter value k before update stored as the preceding counter value $k_{prev}$ in step S3 or S4 as the counter value k (step S7). When it is now determined that the saturation condition is met, the counter value k is returned to the counter value before being updated in step S3 or S4. Then, the weight setting unit 49 proceeds to step S8.

When it is determined in step S6 that the saturation condition is not met (step S6: NO), the weight setting unit 49 proceeds to step S8.

In step S8, the weight setting unit 49 computes the first weight W1 and the second weight W2 based on the following expression (11), sets the obtained first weight W1 to the first weight multiplication unit 45, and sets the obtained second weight W2 to the second weight multiplication unit 46. Then, the weight setting unit 49 returns to step S2.

$$\begin{aligned} W1 &= 1 - D_{e\_norm} \\ W2 &= D_{e\_norm} \end{aligned} \tag{11}$$

When the driving mode is in the normal mode, the weight setting unit 49 sets the first weight W1 to 1, and sets the second weight W2 to 0. Thus, when in the normal mode, drive of the electric motor 18 is controlled based on only the assist torque instruction value $T_{as}$.

In the procedure in FIG. 9, when the operation involvement amount $D_{e\_norm}$ of the driver becomes larger, the first weight W1 for the assist torque instruction value $T_{as}$ becomes smaller, and the second weight W2 for the integrated motor torque instruction value $T_{mint}$ becomes larger. When the operation involvement amount $D_{e\_norm}$ of the driver becomes smaller, conversely, the first weight W1 for the assist torque instruction value $T_{as}$ becomes larger, and the second weight W2 for the integrated motor torque instruction value $T_{mint}$ becomes smaller.

This allows the driver to recognize that driving assist (LCA in this embodiment) is canceled if no steering wheel operation is performed. This prompts the driver to maintain a steering wheel operation when in the driving assist mode. This also prevents the driving assist (LCA in this embodiment) function from being activated in the absence of a steering wheel operation, allowing safer travel even when the reliability of the driving assist system is low.

When the driver recognizes that driving assist is canceled in the absence of a steering wheel operation, the driver positively operates the steering wheel 2. In typical vehicles, however, driving assist is canceled by overriding when the torsion bar torque is large. In the present embodiment, drive of the electric motor 18 is controlled based on the integrated motor torque instruction value $T_{mint}$ in a state in which a steering wheel operation is continued, which enables steering based on the steering wheel operation by the driver. Thus, in the present embodiment, there is no need to cancel driving assist based on the steering wheel operation by the driver, and therefore driving assist based on the steering wheel operation is not canceled (overridden).

Figure 10:
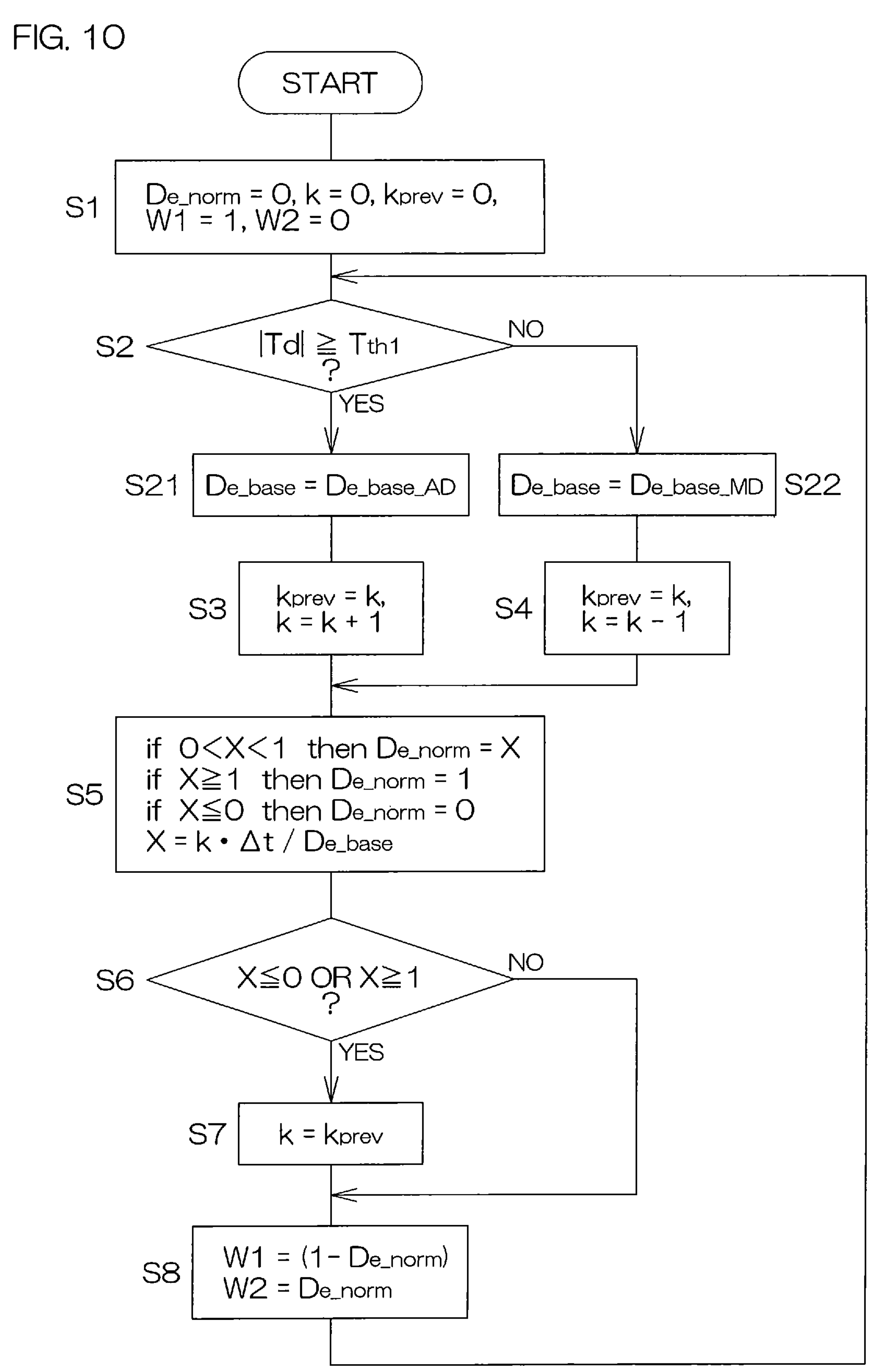
FIG. 10 is a flowchart illustrating the procedure of another example of the weight setting process performed by the weight setting unit when in the driving assist mode.

FIG. 10 is a flowchart illustrating the procedure of another example of the weight setting process performed by the weight setting unit when in the driving assist mode.

In FIG. 10, steps that are the same as the steps in FIG. 9 discussed earlier are given the same step numbers as the step numbers in FIG. 9.

In the procedure in FIG. 10, a first operation involvement reference time $D_{e\_base\_AD}$ in which the first weight W1 is varied from 1 to 0 (the second weight W2 from 0 to 1) and a second operation involvement reference time $D_{e\_base\_MD}$ in which the first weight W1 is varied from 0 to 1 (the second weight W2 from 1 to 0) are set in advance as the operation involvement reference time $D_{e\_base}$.

$D_{e\_base\_AD}$ is a time in which the first weight W1 is set to 0 (the second weight W2 to 1) when a state in which the steering wheel 2 is operated (state with $|T_d|\geq T_{th1}$) has continued for the time $D_{e\_base\_AD}$ or more from a state in which the first weight W1 is 1 (the second weight W2 is 0), and has been set in advance. $D_{e\_base\_MD}$ is a time in which the first weight W1 is set to 1 (the second weight W2 to 0) when a state in which the steering wheel 2 is not operated (state with $|T_d|<T_{th1}$) has continued for the time $D_{e\_base\_MD}$ or more from a state in which the first weight W1 is 0 (the second weight W2 is 1), and has been set in advance.

In the procedure in FIG. 10, $D_{e\_base\_AD}$ is a time set when the operation involvement amount $D_{e\_norm}$ is varied in the increasing direction, and $D_{e\_base\_MD}$ is a time set when the operation involvement amount $D_{e\_norm}$ is varied in the decreasing direction.

When it is determined in step S2 that $|T_d|\geq T_{th1}$ is met, the weight setting unit 49 sets the operation involvement reference time $D_{e\_base}$ to be used to compute the operation involvement amount $D_{e\_norm}$ in step S5 to the first operation involvement reference time $D_{e\_base\_AD}$ (step S21). Then, the weight setting unit 49 proceeds to step S3.

When it is determined in step S2 that $|T_d|<T_{th1}$ is met, on the other hand, the weight setting unit 49 sets the operation involvement reference time $D_{e\_base}$ to be used to compute the operation involvement amount $D_{e\_norm}$ in step S5 to the second operation involvement reference time $D_{e\_base\_MD}$ (step S22). Then, the weight setting unit 49 proceeds to step S4. Steps other than step S21 and step S22 are the same as those in FIG. 9.

When priority is given to the driving assist, the first operation involvement reference time $D_{e\_base\_AD}$ is set to be shorter than the second operation involvement reference time $D_{e\_base\_MD}$. In this case, the driving assist is activated immediately when the torsion bar torque $T_{tb}$ becomes equal to or more than the first threshold $T_{th1}$. The driving assist is continued to a certain degree also when the torsion bar torque $T_{tb}$ is less than the first threshold $T_{th1}$.

When priority is given to the steering wheel operation by the driver, the second operation involvement reference time $D_{e\_base\_MD}$ is set to be shorter than the first operation involvement reference time $D_{e\_base\_AD}$. In this case, the driving assist is deactivated immediately when the torsion bar torque $T_{tb}$ becomes less than the first threshold $T_{th1}$.

The procedure in FIG. 10 also provides the same effect as the procedure in FIG. 9.

Figure 11:
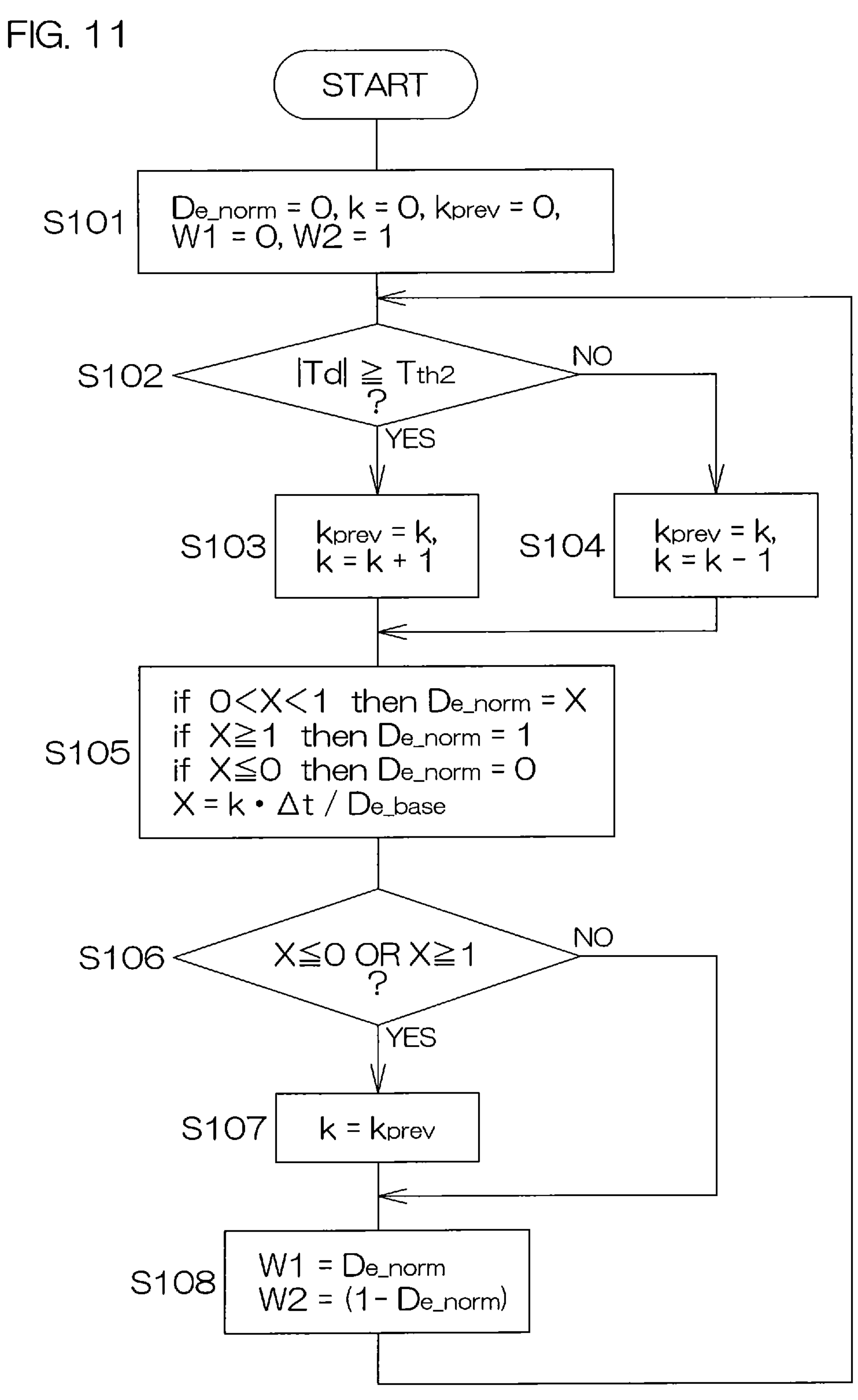
FIG. 11 is a flowchart illustrating the procedure of still another example of the weight setting process performed by the weight setting unit when in the driving assist mode.

FIG. 11 is a flowchart illustrating the procedure of still another example of the weight setting process performed by the weight setting unit 49 when in the driving assist mode.

When the driving mode is in the driving assist mode, the weight setting unit 49 makes initial setting (step S101). In the initial setting, the weight setting unit 49 sets an operation involvement amount $D_{e\_norm}$ that represents the degree of involvement of the driver in the operation of the steering wheel 2 to 0, and sets a counter value k and a preceding counter value $k_{prev}$ to 0. In addition, the weight setting unit 49 sets the first weight W1 to 0, and sets the second weight W2 to 1. The operation involvement amount $D_{e\_norm}$ takes a value in the range of 0 or more and 1 or less.

When the driving mode is in the driving assist mode, the automatic steering instruction value $\theta_{adac}$ is set by the higher-level ECU 201, and the automatic steering instruction value $\theta_{adac}$ is provided to the motor control ECU 202.

Next, the weight setting unit 49 determines whether an absolute value $|T_d|$ of the torsion bar torque $T_d$ is equal to or more than a predetermined second threshold $T_{th2}$ (step S102).

When $|T_d|\geq T_{th2}$ is met (step S102: YES), the weight setting unit 49 saves the present counter value k as the preceding counter value $k_{prev}$, and thereafter increments the counter value k by 1 (+1) (step S103). Then, the weight setting unit 49 proceeds to step S105.

When it is determined in step S102 that $|T_d|<T_{th2}$ is met (step S102: NO), the weight setting unit 49 saves the present counter value k as the preceding counter value $k_{prev}$, and thereafter decrements the counter value k by 1 (−1) (step S104). Then, the weight setting unit 49 proceeds to step S105.

In step S105, the operation involvement amount $D_{e\_norm}$ is computed based on the following expression (12).

$$\text{if } 0 < X < 1 \text{ then } D_{e\_norm} = X \tag{12}$$
$$\text{if } X \geq 1 \text{ then } D_{e\_norm} = 1$$
$$\text{if } X \leq 0 \text{ then } D_{e\_norm} = 0$$

-continued $$X = k \cdot \Delta t / D_{e\_base}$$

In the expression (12), Δt is a computation period [sec], and $D_{e\_base}$ is an operation involvement reference time [sec]. The processes in step S102 to step S108 in FIG. 11 are repeatedly executed at intervals of a predetermined time. This predetermined time is the computation period Δt.

In the procedure in FIG. 11, the operation involvement reference time $D_{e\_base}$ is a time in which the first weight W1 is set to 1 and the second weight W2 is set to 0 when a state in which the steering wheel 2 is operated (state with $|T_d|\geq T_{th2}$) has continued for the time $D_{e\_base}$ or more from a state in which the first weight W1 is 0 and the second weight W2 is 1, and has been set in advance. The operation involvement reference time $D_{e\_base}$ is also a time in which the first weight W1 is set to 0 and the second weight W2 is set to 1 when a state in which the steering wheel 2 is not operated (state with $|T_d|<T_{th2}$) has continued for the time $D_{e\_base}$ or more from a state in which the first weight W1 is 1 and the second weight W2 is 0.

Next, the weight setting unit 49 determines whether a saturation condition of X≤0 or X≥1 is met (step S106). When the saturation condition is met (step S106: YES), the weight setting unit 49 sets the counter value k before update stored as the preceding counter value $k_{prev}$ in step S103 or S104 as the counter value k (step S107). When it is now determined that the saturation condition is met, the counter value k is returned to the counter value before being updated in step S103 or S104. Then, the weight setting unit 49 proceeds to step S108.

When it is determined in step S106 that the saturation condition is not met (step S106: NO), the weight setting unit 49 proceeds to step S108.

In step S108, the weight setting unit 49 computes the first weight W1 and the second weight W2 based on the following expression (13), sets the obtained first weight W1 to the first weight multiplication unit 45, and sets the obtained second weight W2 to the second weight multiplication unit 46. Then, the weight setting unit 49 returns to step S102.

$$W1 = D_{e\_norm} \tag{13}$$
$$W2 = 1 - D_{e\_norm}$$

When the driving mode is in the normal mode, the weight setting unit 49 sets the first weight W1 to 1, and sets the second weight W2 to 0. Thus, when in the normal mode, drive of the electric motor 18 is controlled based on only the assist torque instruction value $T_{as}$.

In the procedure in FIG. 11, when the operation involvement amount $D_{e\_norm}$ of the driver becomes larger, the first weight W1 for the assist torque instruction value $T_{as}$ becomes larger, and the second weight W2 for the integrated motor torque instruction value $T_{mint}$ becomes smaller. When the operation involvement amount $D_{e\_norm}$ of the driver becomes smaller, conversely, the first weight W1 for the assist torque instruction value $T_{as}$ becomes smaller, and the second weight W2 for the integrated motor torque instruction value $T_{mint}$ becomes larger.

This makes it possible to substantially inactivate (override) the driving assist when the driver performs steering intervention (manual driving) when in the driving assist mode. This makes it easy to perform steering intervention when in the driving assist mode. With the procedure in FIG. 11, the driving assist is substantially inactivated when the driver intervenes in steering when in the driving assist mode, and therefore it is important to detect if the driver is reliably involved in a steering wheel operation. Thus, the second threshold $T_{th2}$ in step S102 is preferably set to be larger than the first threshold $T_{th1}$ in step S2 in FIG. 9.

When the driver does not intervene in operations, the driving assist is activated, allowing safe travel even in a state in which the driver is not involved in operations when the reliability of the driving assist system is high.

Figure 12:
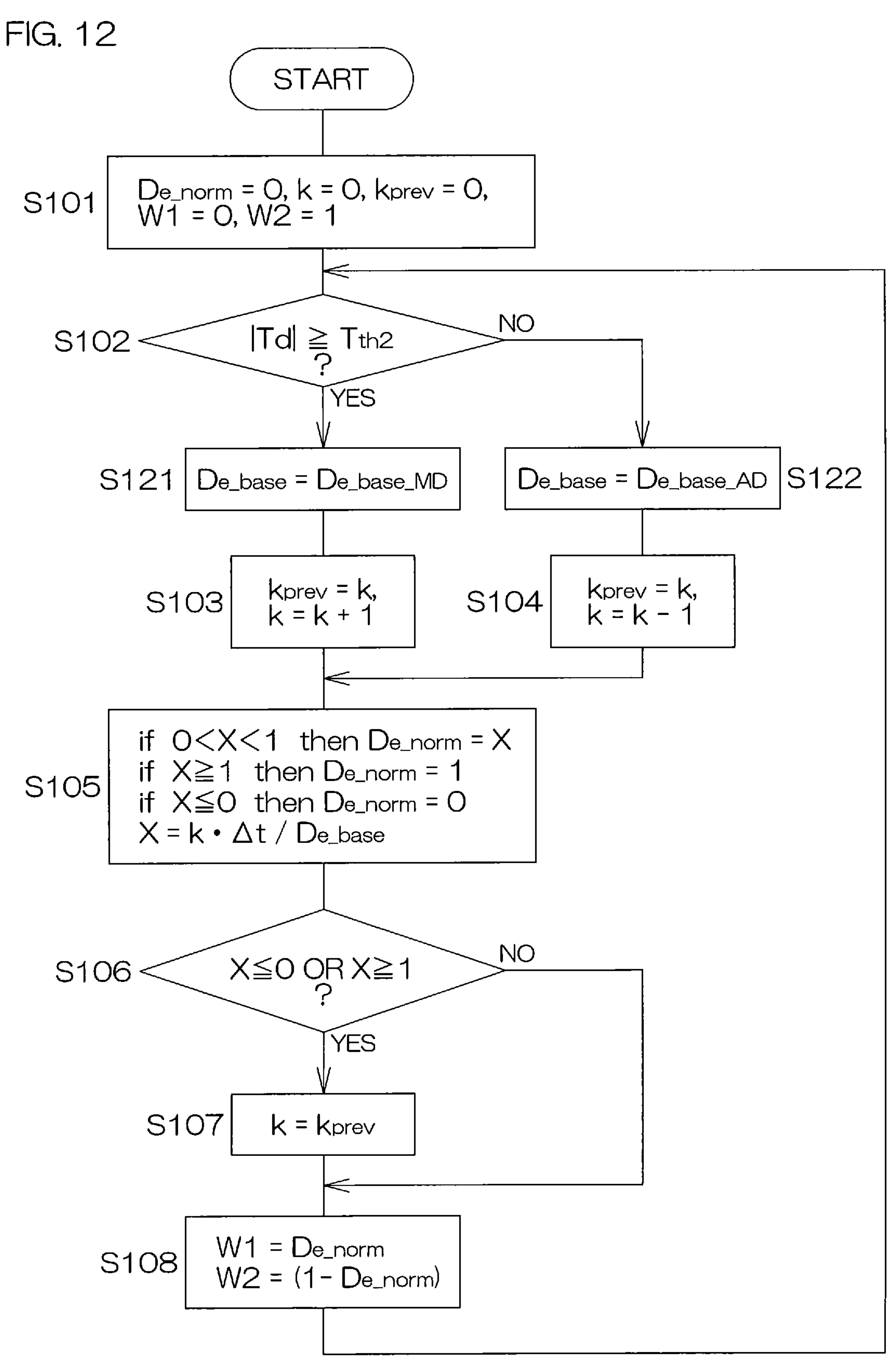
FIG. 12 is a flowchart illustrating the procedure of still another example of the weight setting process performed by the weight setting unit when in the driving assist mode.

FIG. 12 is a flowchart illustrating the procedure of still another example of the weight setting process performed by the weight setting unit when in the driving assist mode.

In FIG. 12, steps that are the same as the steps in FIG. 11 discussed earlier are given the same step numbers as the step numbers in FIG. 11.

In the procedure in FIG. 12, a first operation involvement reference time $D_{e\_base\_AD}$ in which the first weight W1 is varied from 1 to 0 (the second weight W2 from 0 to 1) and a second operation involvement reference time $D_{e\_base\_MD}$ in which the first weight W1 is varied from 0 to 1 (the second weight W2 from 1 to 0) are set in advance as the operation involvement reference time $D_{e\_base}$.

$D_{e\_base\_MD}$ is a time in which the first weight W1 is set to 1 (the second weight W2 to 0) when a state in which the steering wheel 2 is operated (state with $|T_d| \geq T_{th2}$) has continued for the time $D_{e\_base\_MD}$ or more from a state in which the first weight W1 is 0 (the second weight W2 is 1), and has been set in advance. $D_{e\_base\_AD}$ is a time in which the first weight W1 is set to 0 (the second weight W2 to 1) when a state in which the steering wheel 2 is not operated (state with $|T_d| < T_{th2}$) has continued for the time $D_{e\_base\_AD}$ or more from a state in which the first weight W1 is 1 (the second weight W2 is 0), and has been set in advance.

In the procedure in FIG. 12, $D_{e\_base\_MD}$ is a time set when the operation involvement amount $D_{e\_norm}$ is varied in the increasing direction, and $D_{e\_base\_AD}$ is a time set when the operation involvement amount $D_{e\_norm}$ is varied in the decreasing direction.

When it is determined in step S102 that $|T_d| \geq T_{th2}$ is met, the weight setting unit 49 sets the operation involvement reference time $D_{e\_base}$ to be used to compute the operation involvement amount $D_{e\_norm}$ in step S105 to the second operation involvement reference time $D_{e\_base\_MD}$ (step S121). Then, the weight setting unit 49 proceeds to step S103.

When it is determined in step S102 that $|T_d| < T_{th2}$ is met, on the other hand, the weight setting unit 49 sets the operation involvement reference time $D_{e\_base}$ to be used to compute the operation involvement amount $D_{e\_norm}$ in step S105 to the first operation involvement reference time $D_{e\_base\_AD}$ (step S122). Then, the weight setting unit 49 proceeds to step S104. Steps other than step S121 and step S122 are the same as those in FIG. 11.

When priority is given to the driving assist, the first operation involvement reference time $D_{e\_base\_AD}$ is set to be shorter than the second operation involvement reference time $D_{e\_base\_MD}$. In this case, the driving assist is activated immediately when the torsion bar torque $T_{tb}$ becomes less than the second threshold $T_{th2}$. The driving assist is continued to a certain degree also when the torsion bar torque $T_{tb}$ is equal to or more than the second threshold $T_{th2}$.

When priority is given to the steering wheel operation by the driver, the second operation involvement reference time $D_{e\_base\_MD}$ is set to be shorter than the first operation involvement reference time $D_{e\_base\_AD}$. In this case, the driving assist is deactivated immediately when the torsion bar torque $T_{tb}$ becomes equal to or more than the second threshold $T_{th2}$. The driving assist is continuously deactivated to a certain degree when the torsion bar torque $T_{tb}$ is less than the second threshold $T_{th2}$.

The procedure in FIG. 12 also provides the same effect as the procedure in FIG. 11.

FIG. 13 is a block diagram illustrating a modification of the motor control ECU 202. In FIG. 13, portions corresponding to those in FIG. 2 discussed earlier are denoted by the same signs as those in FIG. 2.

In the motor control ECU 202, a third weight multiplication unit 50 is provided between an input terminal (not illustrated) for the automatic steering instruction value $\theta_{adac}$ and the integrated angle instruction value computation unit 43.

The automatic steering instruction value $\theta_{adac}$ provided from the higher-level ECU 201 is input to the third weight multiplication unit 50. The third weight multiplication unit 50 multiplies the automatic steering instruction value $\theta_{adac}$ by a third weight W3. The automatic steering instruction value after being multiplied by the third weight, $W3 \cdot \theta_{adac}$, is provided to the integrated angle instruction value computation unit 43. The integrated angle instruction value computation unit 43 computes the integrated angle instruction value $\theta_{sint}$ by adding the manual steering instruction value $\theta_{mdac}$ generated by the manual steering instruction value generation unit 42 to the automatic steering instruction value after being multiplied by the third weight, $W3 \cdot \theta_{adac}$. The angle control unit 44 computers an integrated motor torque instruction value $T_{mint}$ that matches the integrated angle instruction value $\theta_{sint}$ based on the integrated angle instruction value $\theta_{sint}$.

The addition unit 47 computes the motor torque instruction value $T_m$ by adding the assist torque instruction value after being multiplied by the first weight, $W1 \cdot T_{as}$, to the integrated motor torque instruction value after being multiplied by the second weight, $W2 \cdot T_{mint}$.

The first weight W1 and the second weight W2 are set by the first weight setting unit 49A. The third weight W3 is set by the second weight setting unit 49B. The first weight setting unit 49A sets the first weight W1 to 0 and sets the second weight W2 to 1 when the driving mode is in the driving assist mode.

Operation of the second weight setting unit 49B will be described.

Figure 14:
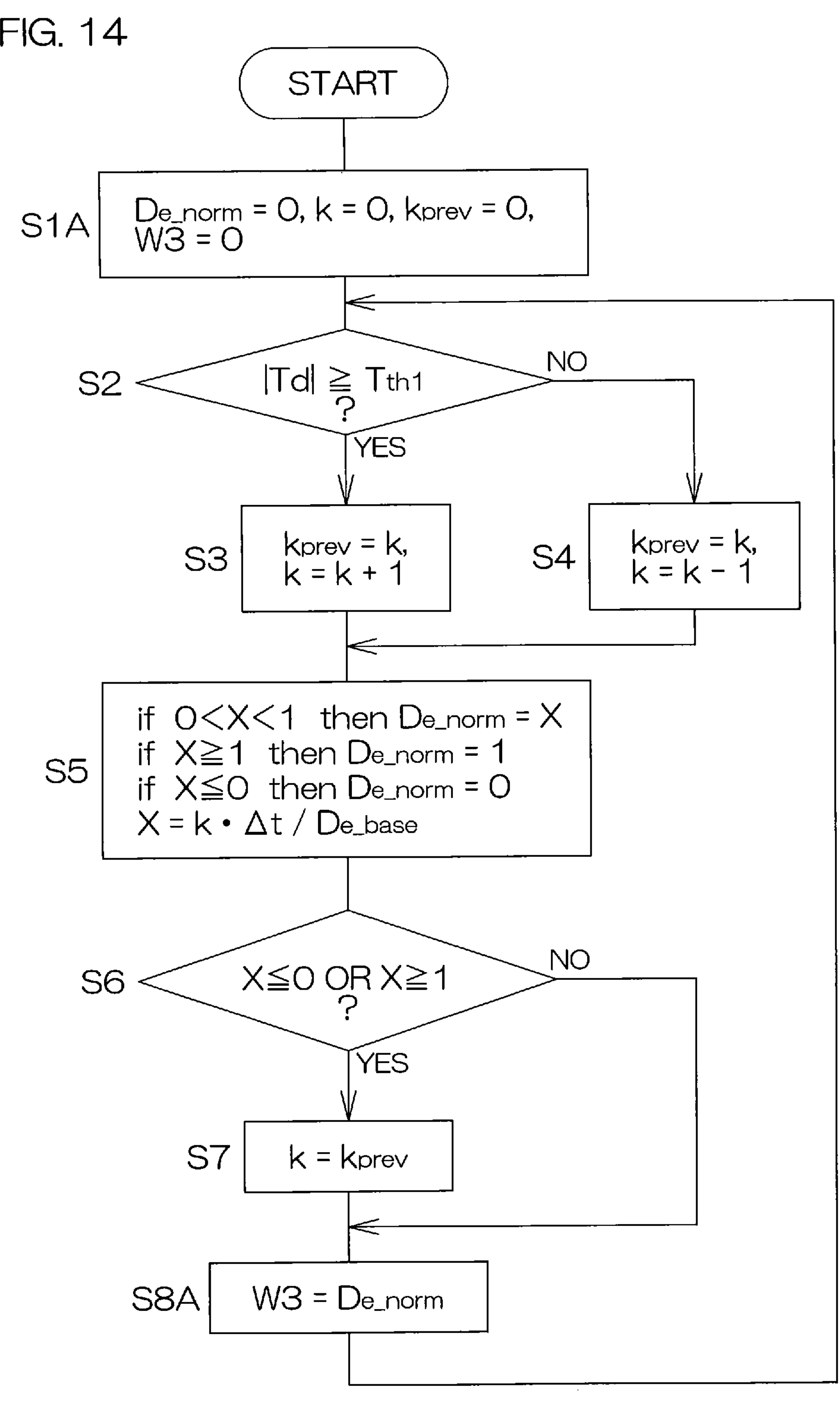
FIG. 14 is a flowchart illustrating the procedure of a weight setting process performed by a second weight setting unit when in a driving assist mode.

FIG. 14 is a flowchart illustrating the procedure of a weight setting process performed by the second weight setting unit 49B when in the driving assist mode. The procedure in FIG. 14 is similar to the procedure in FIG. 9 discussed earlier. In FIG. 14, steps that are the same as the steps in FIG. 9 are given the same step numbers as the step numbers in FIG. 9.

In FIG. 14, step S1A corresponding to step S1 in FIG. 9 and step S8A corresponding to step S8 in FIG. 9 are different from such steps in FIG. 9.

In step S1A, the second weight setting unit 49B sets the operation involvement amount $D_{e\_norm}$, the counter value k, and the preceding counter value $k_{prev}$ to 0. In addition, the second weight setting unit 49B sets the third weight W3 to 0.

In step S8A, the second weight setting unit 49B computes the third weight W3 based on the following expression (14), and sets the third weight W3 to the third weight multiplication unit 50.

$$W3 = D_{e\_norm} \tag{14}$$

When in the driving assist mode, the first weight W1 for the assist torque instruction value $T_{as}$ is brought to 0, and the second weight W2 for the integrated motor torque instruction value $T_{mint}$ is brought to 1. When the operation involvement amount $D_{e\_norm}$ of the driver becomes larger, the third weight W3 for the automatic steering instruction value $\theta_{adac}$ becomes larger. When the operation involvement amount $D_{e\_norm}$ of the driver becomes smaller, conversely, the third weight W3 for the automatic steering instruction value $\theta_{adac}$ becomes smaller.

This allows the driver to recognize that driving assist (LCA in this embodiment) is canceled if no steering wheel operation is performed. This prompts the driver to maintain a steering wheel operation when in the driving assist mode. This also prevents the driving assist (LCA in this embodiment) function from being activated in the absence of a steering wheel operation, allowing safer travel even when the reliability of the driving assist system is low.

When the driving mode is in the normal mode, the first weight setting unit 49A sets the first weight W1 to 1, and sets the second weight W2 to 0. The second weight setting unit 49B sets the third weight W3 to 0 or 1. Thus, when in the normal mode, the electric motor 18 is controlled based on only the assist torque instruction value $T_{as}$.

When in the normal mode, the first weight setting unit 49A may set the first weight W1 to 0 and set the second weight W2 to 1, and the second weight setting unit 49B may set the third weight W3 to 0. In this manner, the electric motor 18 is controlled based on angle control according to the manual steering instruction value $\theta_{mdac}$ set by the manual steering instruction value generation unit 42 when in the normal mode.

Figure 15:
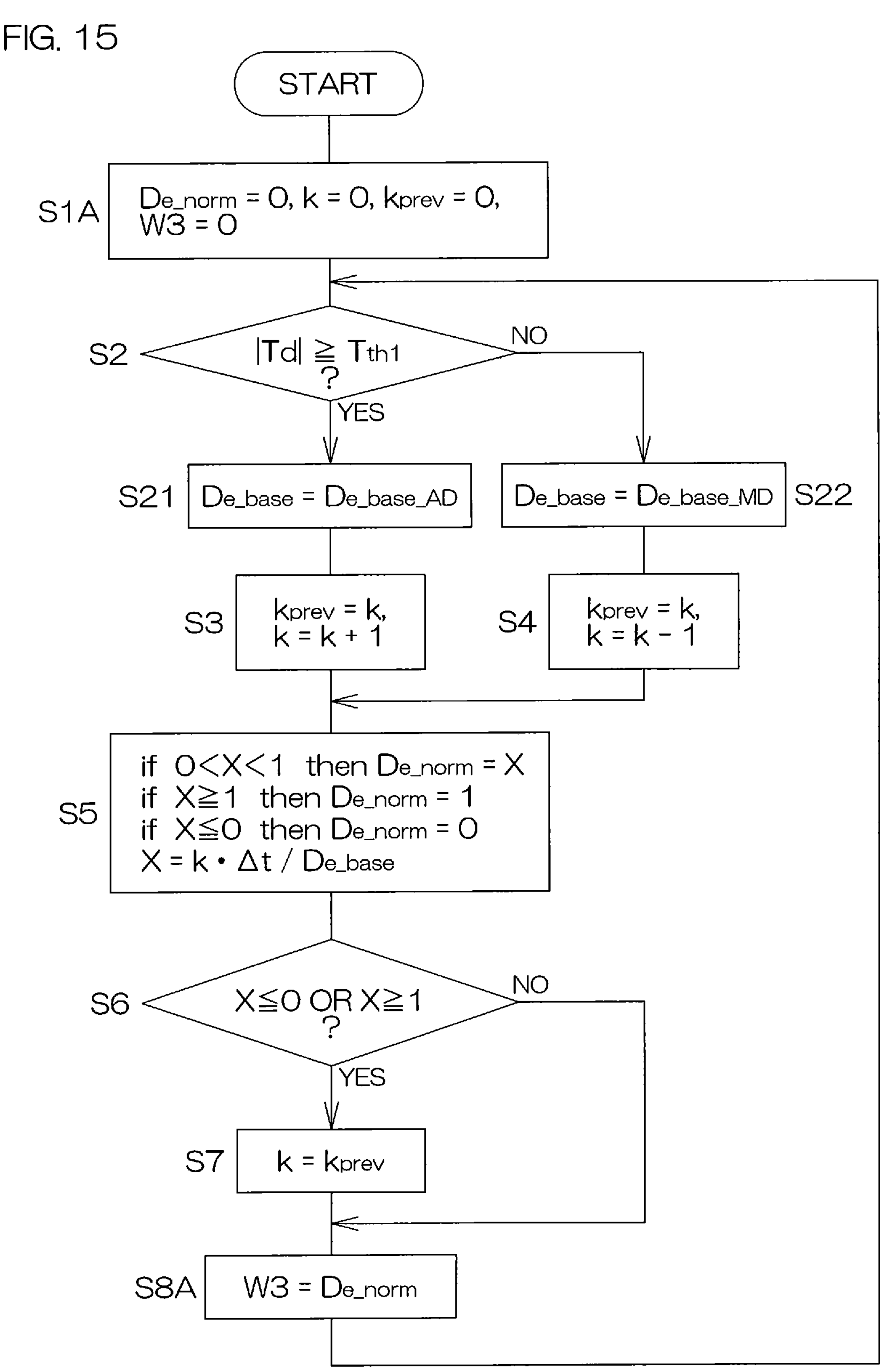
FIG. 15 is a flowchart illustrating the procedure of another example of the weight setting process performed by the second weight setting unit when in the driving assist mode.

When in the driving assist mode, the second weight setting unit 49B may set the third weight W3 through the procedure illustrated in FIG. 15. The procedure in FIG. 15 is similar to the procedure in FIG. 10 discussed earlier. In FIG. 15, steps that are the same as the steps in FIG. 10 are given the same step numbers as the step numbers in FIG. 10.

$D_{e\_base\_AD}$ is a time in which the third weight W3 is set to 1 when a state in which the steering wheel 2 is operated (state with $|T_d| \geq T_{th1}$) has continued for the time $D_{e\_base\_AD}$ or more from a state in which the third weight W3 is 0, and has been set in advance. $D_{e\_base\_MD}$ is a time in which the third weight W3 is set to 0 when a state in which the steering wheel 2 is not operated (state with $|T_d| < T_{th1}$) has continued for the time $D_{e\_base\_MD}$ or more from a state in which the third weight W3 is 1, and has been set in advance.

That is, $D_{e\_base\_AD}$ is a time set when the operation involvement amount $D_{e\_norm}$ is varied in the increasing direction, and $D_{e\_base\_MD}$ is a time set when the operation involvement amount $D_{e\_norm}$ is varied in the decreasing direction.

In FIG. 15, step S1A corresponding to step S1 in FIG. 10 and step S8A corresponding to step S8 in FIG. 10 are different from such steps in FIG. 10.

In step S1A, the second weight setting unit 49B sets the operation involvement amount $D_{e\_norm}$, the counter value k, and the preceding counter value $k_{prev}$ to 0. In addition, the second weight setting unit 49B sets the third weight W3 to 0.

In step S8A, the second weight setting unit 49B computes the third weight W3 based on the above expression (14), and sets the third weight W3 to the third weight multiplication unit 50.

The procedure in FIG. 15 also provides the same effect as the procedure in FIG. 14.

Figure 16:
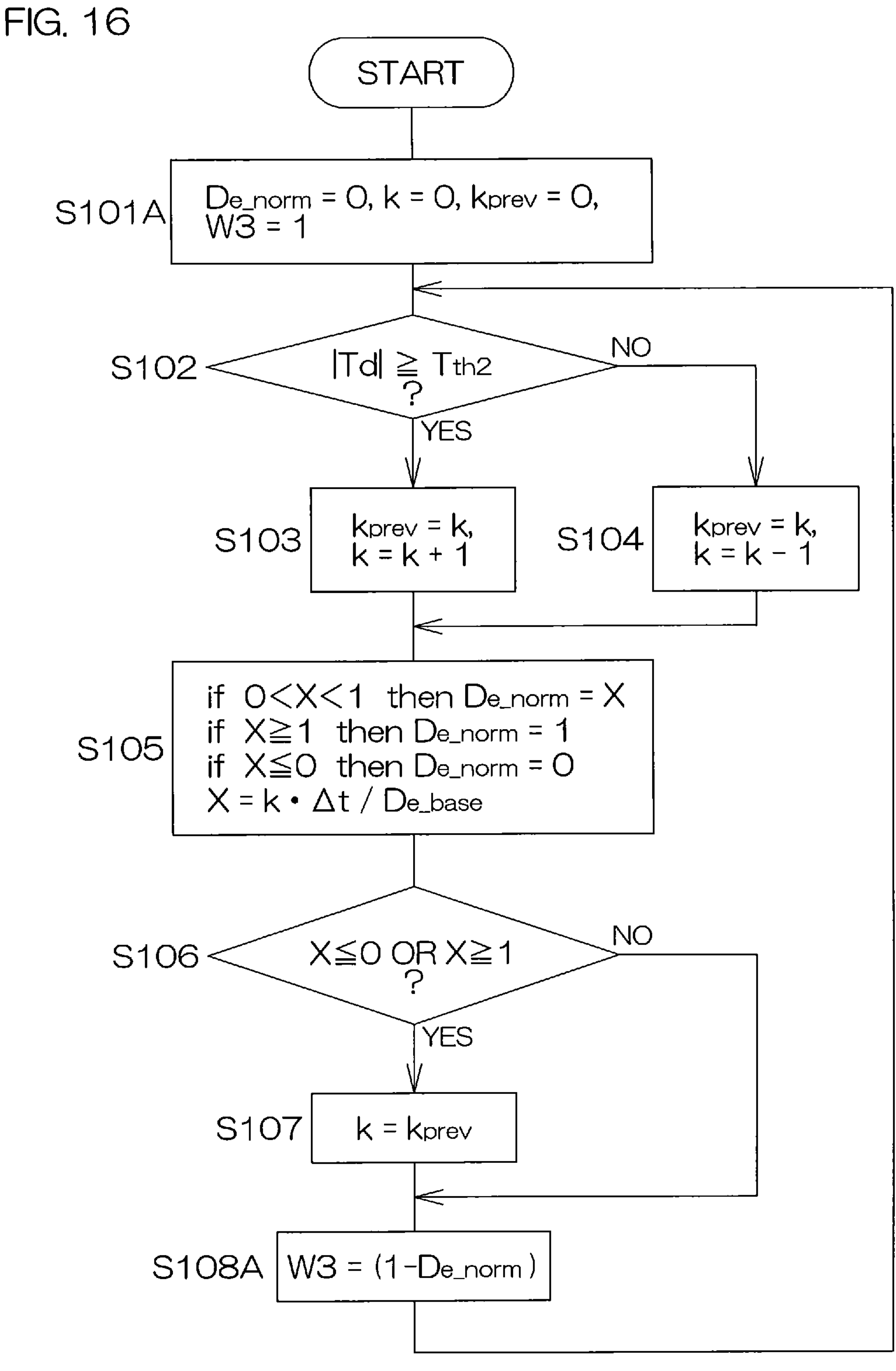
FIG. 16 is a flowchart illustrating the procedure of another example of the weight setting process performed by the second weight setting unit when in the driving assist mode.

FIG. 16 is a flowchart illustrating the procedure of still another example of the weight setting process performed by the second weight setting unit 49B when in the driving assist mode. The procedure in FIG. 16 is similar to the procedure in FIG. 11 discussed earlier. In FIG. 16, steps that are the same as the steps in FIG. 11 are given the same step numbers as the step numbers in FIG. 11.

In FIG. 16, step S101A corresponding to step S101 in FIG. 11 and step S108A corresponding to step S108 in FIG. 11 are different from such steps in FIG. 11.

In step S101A, the second weight setting unit 49B sets the operation involvement amount $D_{e\_norm}$ to 0, and sets the counter value k and the preceding counter value $k_{prev}$ to 0. In addition, the second weight setting unit 49B sets the third weight W3 to 1.

In step S108A, the second weight setting unit 49B computes the third weight W3 based on the following expression (15), and sets the third weight W3 to the third weight multiplication unit 50.

$$W3 = (1 - D_{e\_norm}) \tag{15}$$

When in the driving assist mode, the first weight W1 for the assist torque instruction value $T_{as}$ is brought to 0, and the second weight W2 for the integrated motor torque instruction value $T_{mint}$ is brought to 1. When the operation involvement amount $D_{e\_norm}$ of the driver becomes larger, the third weight W3 for the automatic steering instruction value $\theta_{adac}$ becomes smaller. When the operation involvement amount $D_{e\_norm}$ of the driver becomes smaller, conversely, the third weight W3 for the automatic steering instruction value $\theta_{adac}$ becomes larger.

This makes it possible to substantially inactivate (override) the driving assist when the driver performs steering intervention (manual driving) when in the driving assist mode. This makes it easy to perform steering intervention when in the driving assist mode. With the procedure in FIG. 16, the driving assist is substantially inactivated when the driver intervenes in steering when in the driving assist mode, and therefore it is important to detect if the driver is reliably involved in a steering wheel operation. Thus, the second threshold $T_{th2}$ in step S102 is preferably set to be larger than the first threshold $T_{th1}$ in step S2 in FIG. 14.

When the driver does not intervene in operations, the driving assist is activated, allowing safe travel even in a state in which the driver is not involved in operations when the reliability of the driving assist system is high.

When the driving mode is in the normal mode, the first weight setting unit 49A sets the first weight W1 to 1, and sets the second weight W2 to 0. The second weight setting unit 49B sets the third weight W3 to 0 or 1. Thus, when in the normal mode, the electric motor 18 is controlled based on only the assist torque instruction value $T_{as}$.

When in the normal mode, the first weight setting unit 49A may set the first weight W1 to 0 and set the second weight W2 to 1, and the second weight setting unit 49B may set the third weight W3 to 0. In this manner, the electric motor 18 is controlled based on angle control according to the manual steering instruction value $\theta_{mdac}$ set by the manual steering instruction value generation unit 42 when in the normal mode.

Figure 17:
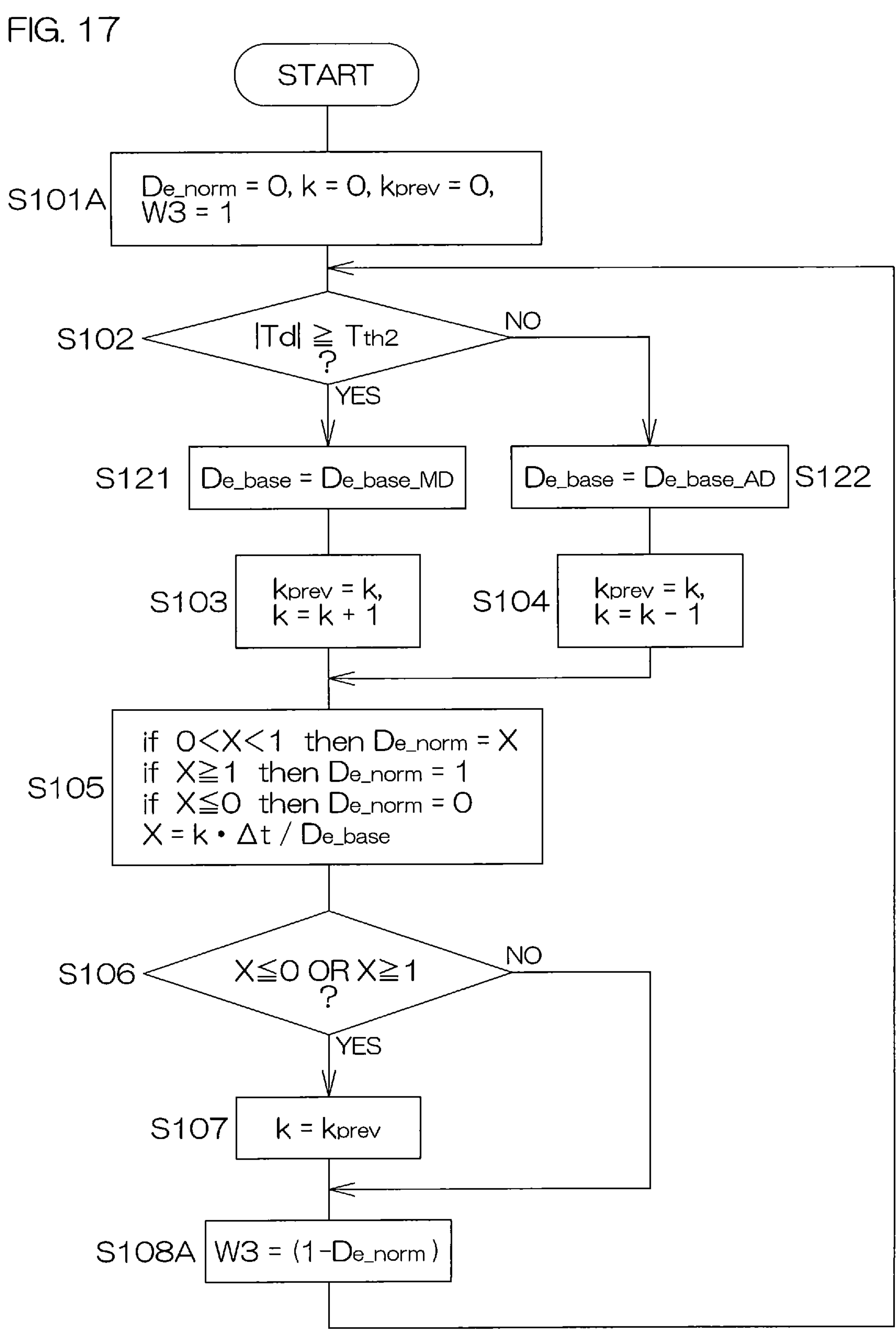
FIG. 17 is a flowchart illustrating the procedure of still another example of the weight setting process performed by the second weight setting unit when in the driving assist mode.

When in the driving assist mode, the second weight setting unit 49B may set the third weight W3 through the procedure illustrated in FIG. 17. The procedure in FIG. 17 is similar to the procedure in FIG. 12 discussed earlier. In FIG. 17, steps that are the same as the steps in FIG. 12 are given the same step numbers as the step numbers in FIG. 12.

$D_{e\_base\_MD}$ is a time in which the third weight W3 is set to 0 when a state in which the steering wheel 2 is operated (state with $|T_d| \geq T_{th2}$) has continued for the time $D_{e\_base\_MD}$ or more from a state in which the third weight W3 is 1, and has been set in advance. $D_{e\_base\_AD}$ is a time in which the third weight W3 is set to 1 when a state in which the steering wheel 2 is not operated (state with $|T_d| < T_{th2}$) has continued for the time $D_{e\_base\_AD}$ or more from a state in which the third weight W3 is 0, and has been set in advance.

In the procedure in FIG. 17, $D_{e\_base\_MD}$ is a time set when the operation involvement amount $D_{e\_norm}$ is varied in the increasing direction, and $D_{e\_base\_AD}$ is a time set when the operation involvement amount $D_{e\_norm}$ is varied in the decreasing direction.

In FIG. 17, step S101A corresponding to step S101 in FIG. 12 and step S108A corresponding to step S108 in FIG. 12 are different from such steps in FIG. 12.

In step S101A, the second weight setting unit 49B sets the operation involvement amount $D_{e\_norm}$ to 0, and sets the counter value k and the preceding counter value $k_{prev}$ to 0. In addition, the second weight setting unit 49B sets the third weight W3 to 1.

In step S108A, the second weight setting unit 49B computes the third weight W3 based on the above expression (15), and sets the third weight W3 to the third weight multiplication unit 50.

The procedure in FIG. 17 also provides the same effect as the procedure in FIG. 16.

The second weight setting unit 49B and the third weight multiplication unit 50 in FIG. 13 are an example of the "third weighting processing unit" according to the present invention. The integrated angle instruction value computation unit 43, the angle control unit 44, and the addition unit 47 in FIG. 13 are an example of the "motor torque instruction value computation unit" according to the present invention. The second weight setting unit 49B, the third weight multiplication unit 50, the integrated angle instruction value computation unit 43, the angle control unit 44, and the addition unit 47 in FIG. 13 are an example of the "switching unit" according to the present invention.

Figure 18:
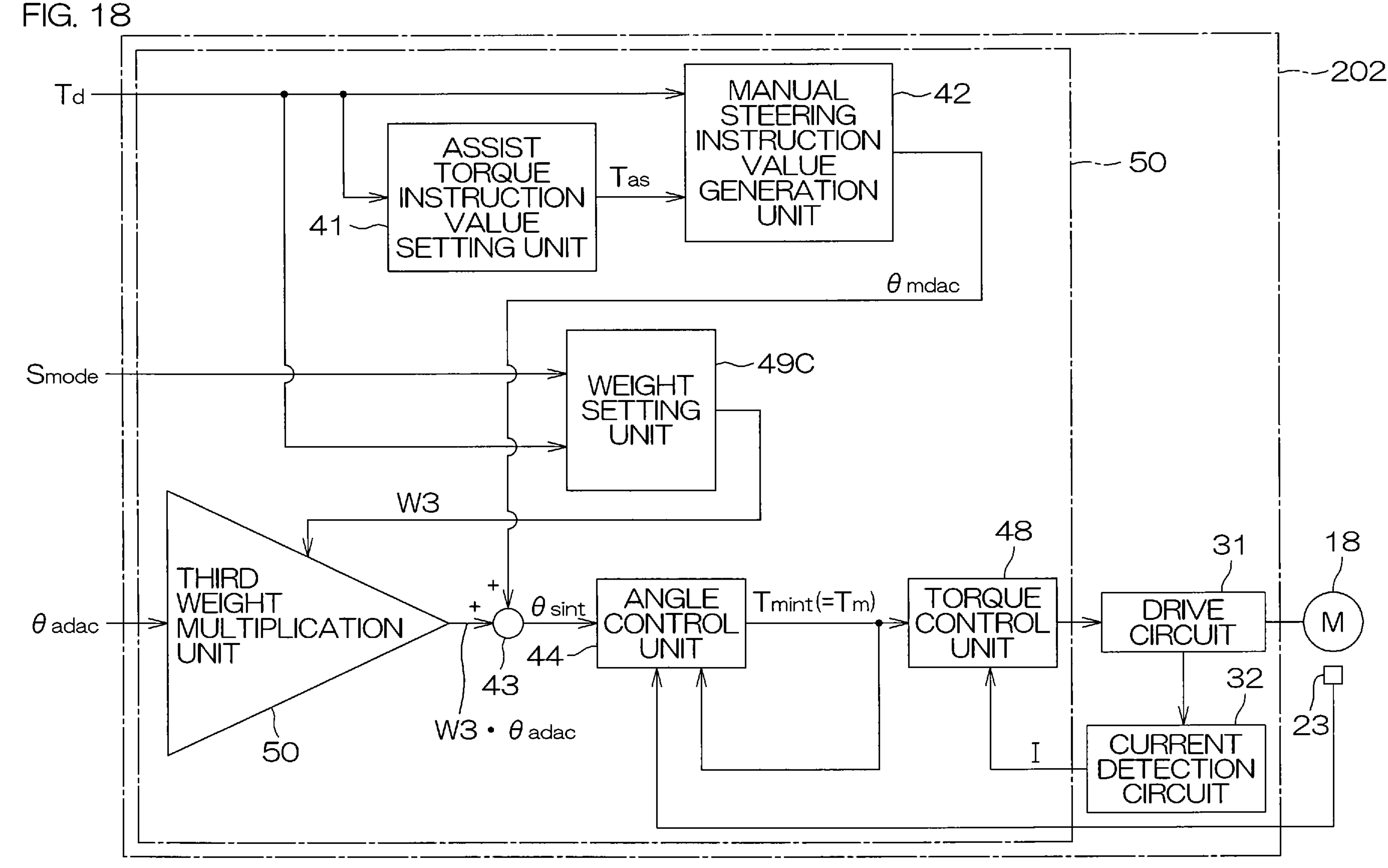
FIG. 18 is a block diagram illustrating another modification of the motor control ECU.

FIG. 18 is a block diagram illustrating another modification of the motor control ECU 202. In FIG. 18, portions corresponding to those in FIG. 13 discussed earlier are denoted by the same signs as those in FIG. 13.

The motor control ECU 202 is not provided with the first weight multiplication unit 45, the second weight multiplication unit 46, the addition unit 47, and the first weight setting unit 49A of the motor control ECU 202 in FIG. 13. A weight setting unit 49C is provided in place of the second weight setting unit 49B in FIG. 13. In this modification, the integrated motor torque instruction value $T_{mint}$ as the output of the angle control unit 44 is used as the motor torque instruction value $T_m$.

The weight setting unit 49C sets the third weight W3. Operation of the weight setting unit 49C in the driving assist mode is the same as the operation of the second weight setting unit 49B in FIG. 13, and thus is not described. When in the normal mode, the weight setting unit 49C sets the third weight W3 to 0.

The weight setting unit 49C and the third weight multiplication unit 50 in FIG. 18 are an example of the "third weighting processing unit" according to the present invention. The integrated angle instruction value computation unit 43 and the angle control unit 44 in FIG. 18 are an example of the "motor torque instruction value computation unit" according to the present invention. The weight setting unit 49C, the third weight multiplication unit 50, and the integrated angle instruction value computation unit 43 in FIG. 18 are an example of the "switching unit" according to the present invention.

While an embodiment and modifications of the present invention have been described above, the present invention may also be implemented in other forms. For example, while it is determined in step S2 in FIGS. 9, 10, 14, and 15 whether the absolute value $|T_{tb}|$ of the torsion bar torque $T_{tb}$ is equal to or more than the first threshold $T_{th1}$ in the embodiment discussed earlier, it may be determined whether an estimated value of driver torque that acts on the steering wheel 2 is equal to or more than the first threshold $T_{th1}$. The estimated value of driver torque may be an estimated value of driver torque estimated by the "driver torque estimation unit" described in Japanese Unexamined Patent Application Publication No. 2017-114324 (JP 2017-114324 A), for example. In that case, the estimated value of driver torque is an example of the "steering torque" in the "switching unit that switches according to steering torque" according to the present invention.

Likewise, while it is determined in step S102 in FIGS. 11, 12, 16, and 17 whether the absolute value $|T_{tb}|$ of the torsion bar torque $T_{tb}$ is equal to or more than the second threshold $T_{th2}$ in the embodiment discussed earlier, it may be determined whether an estimated value of driver torque that acts on the steering wheel 2 is equal to or more than the second threshold $T_{th2}$.

In FIGS. 2 and 13 discussed earlier, the assist torque instruction value $T_{as}$ is multiplied by the first weight W1, and the assist torque instruction value after being multiplied by the first weight, $W1 \cdot T_{as}$, is provided to the addition unit 47. Instead, however, the manual steering instruction value $\theta_{mdac}$ may be multiplied by the first weight W1, and the manual steering instruction value after being multiplied by the first weight may be provided to the addition unit 47.

In the embodiment discussed earlier, the angle control unit 44 (see FIG. 5) includes the feedforward control unit 53. However, the feedforward control unit 53 may be omitted. In this case, the feedback control torque $T_{fb}$ computed by the feedback control unit 52 is basic target torque.

The embodiment discussed earlier indicates an example in which this invention is applied to a column type EPS. However, this invention is also applicable to an EPS other than the column type. This invention is also applicable to a steer-by-wire system.

While an embodiment of the present invention has been described in detail above, this is merely a specific example that is used to clarify the technical content of the present invention, and the present invention should not be construed as being limited to the specific example, and the scope of the present invention is limited only by the appended claims.

This application corresponds to an international patent application (PCT/JP2021/037906) filed with the Japan Patent Office as the receiving office on Oct. 13, 2021, the entire disclosure of which is incorporated herein by reference.

DESCRIPTION OF THE REFERENCE NUMERALS

1 . . . electric power steering system, 3 . . . steered wheel, 4 . . . steering operation mechanism, 18 . . . electric motor, 41 . . . assist torque instruction value setting unit, 42 . . . manual steering instruction value generation unit, 43 . . . integrated angle instruction value computation unit, 44 . . . angle control unit, 45 . . . first weight multiplication unit, 46 . . . second weight multiplication unit, 47 . . . addition unit, 48 . . . torque control unit, 49, 49A, 49B . . . weight setting unit, 50 . . . third weight multiplication unit

The invention claimed is:

1. A motor control device that controls drive of an electric motor for steering angle control, the motor control device comprising:

an assist torque instruction value generation unit that generates an assist torque instruction value using steering torque;

a manual steering instruction value generation unit that generates a manual steering instruction value using the steering torque and the assist torque instruction value;

an integrated angle instruction value computation unit that computes an integrated angle instruction value by adding the manual steering instruction value to an automatic steering instruction value for driving assist; and a switching unit that switches between a first control mode, in which the electric motor is controlled based on the assist torque instruction value or the manual steering instruction value, and a second control mode, in which the electric motor is controlled based on the integrated angle instruction value, according to the steering torque when in a driving assist mode, wherein the switching unit includes:

a first weighting unit that performs a first weighting process of multiplying the assist torque instruction value or the manual steering instruction value by a first weight based on the steering torque;

a second weighting unit that performs a second weighting process of multiplying the integrated angle instruction value by a second weight based on the steering torque; and a motor torque instruction value computation unit that computes a motor torque instruction value based on the assist torque instruction value or the manual steering instruction value after the first weighting process and the integrated angle instruction value after the second weighting process, the switching unit determines whether the absolute value of the steering torque is equal to or greater than a predetermined threshold value at each predetermined time interval, and when the switching unit determines that the absolute value of the steering torque is equal to or greater than the threshold value, the switching unit increases the second weight and decreases the first weight.

2. A motor control device that controls drive of an electric motor for steering angle control, the motor control device comprising:

an assist torque instruction value generation unit that generates an assist torque instruction value using steering torque;

a manual steering instruction value generation unit that generates a manual steering instruction value using the steering torque and the assist torque instruction value;

an integrated angle instruction value computation unit that computes an integrated angle instruction value by adding the manual steering instruction value to an automatic steering instruction value for driving assist; and a switching unit that switches between a first control mode, in which the electric motor is controlled based on the assist torque instruction value or the manual steering instruction value, and a second control mode, in which the electric motor is controlled based on the integrated angle instruction value, according to the steering torque when in a driving assist mode, wherein the switching unit includes:

a third weighting unit that performs a third weighting process on the automatic steering instruction value based on the steering torque; and a motor torque instruction value computation unit that computes a motor torque instruction value based on the automatic steering instruction value after the third weighting process and the manual steering instruction value.

3. The motor control device according to claim 1, wherein when the switching unit determines that the absolute value of the steering torque is less than the threshold value, the switching unit increases the first weight and decreases the second weight.

4. A motor control device that controls drive of an electric motor for steering angle control, the motor control device comprising:

an assist torque instruction value generation unit that generates an assist torque instruction value using steering torque;

a manual steering instruction value generation unit that generates a manual steering instruction value using the steering torque and the assist torque instruction value;

an integrated angle instruction value computation unit that computes an integrated angle instruction value by adding the manual steering instruction value to an automatic steering instruction value for driving assist; and a switching unit that switches between a first control mode, in which the electric motor is controlled based on the assist torque instruction value or the manual steering instruction value, and a second control mode, in which the electric motor is controlled based on the integrated angle instruction value, according to the steering torque when in a driving assist mode, wherein the switching unit includes:

a first weighting unit that performs a first weighting process of multiplying the assist torque instruction value or the manual steering instruction value by a first weight based on the steering torque;

a second weighting unit that performs a second weighting process of multiplying the integrated angle instruction value by a second weight based on the steering torque; and a motor torque instruction value computation unit that computes a motor torque instruction value based on the assist torque instruction value or the manual steering instruction value after the first weighting process and the integrated angle instruction value after the second weighting process, the switching unit determines whether the absolute value of the steering torque is equal to or greater than a predetermined threshold value at each predetermined time interval, and when the switching unit determines that the absolute value of the steering torque is equal to or greater than the threshold value, the switching unit increases the first weight and decreases the second weight.

5. The motor control device according to claim 4, wherein when the switching unit determines that the absolute value of the steering torque is less than the threshold value, the switching unit increases the second weight and decreases the first weight.

* * * * *